US012650860B1

(12) United States Patent (10) Patent No.: US 12,650,860 B1
Dorsey et al. (45) Date of Patent: Jun. 9, 2026

(54) PATTERN SELECTION FOR INTEGRATION ARCHITECTURE

(71) Applicant: THE HUNTINGTON NATIONAL BANK, Columbus, OH (US)

(72) Inventors: Julie Dorsey, Columbus, OH (US);
James Hartley, Columbus, OH (US);
Dale Kelley, Columbus, OH (US)

(73) Assignee: The Huntington National Bank,
Columbus, OH (US)

( * ) Notice: Subject to any disclaimer, the term of this
patent is extended or adjusted under 35
U.S.C. 154(b) by 0 days.

(21) Appl. No.: 19/392,230

(22) Filed: Nov. 18, 2025

Related U.S. Application Data

(63) Continuation of application No. 19/389,840, filed on
Nov. 14, 2025.

(51) Int. Cl.
*G06F 3/048* (2013.01)
*G06F 3/0482* (2013.01)
*G06F 3/0484* (2022.01)
*G06F 9/451* (2018.01)
*G06F 9/54* (2006.01)

(52) U.S. Cl.
CPC ............ *G06F 9/451* (2018.02); *G06F 3/0482*
(2013.01); *G06F 3/0484* (2013.01); *G06F*
*9/54* (2013.01)

(58) Field of Classification Search
None
See application file for complete search history.

(56) References Cited

U.S. PATENT DOCUMENTS

| | | | | |
|---|---|---|---|---|
| 9,740,792 | B2 * | 8/2017 | Wang | G06F 16/986 |
| 2015/0370890 | A1 * | 12/2015 | Halan | G06F 16/288 |
| | | | | 707/728 |
| 2018/0121486 | A1 * | 5/2018 | Puvvada | G06F 21/604 |
| 2021/0064591 | A1 * | 3/2021 | Sun | G06F 16/182 |

* cited by examiner

*Primary Examiner* — Thanh T Vu
(74) *Attorney, Agent, or Firm* — Kilpatrick Townsend &
Stockton LLP

(57) ABSTRACT

A system and method are disclosed for managing integration patterns among a plurality of nodes in a networked environment. Each node is assigned a unique identifier, and integration patterns defining relationships between two or more nodes are represented as vectors comprising node identifiers and additional attributes such as protocol, security context, or dependencies. The vectors are validated using predefined logic and are indexed and stored within a multi-dimensional matrix according to their defining attributes. The system maintains metadata for each vector, including integration dependencies, approval status, and versioning. A graphical user interface presents the matrix as an interactive grid, enabling users to filter, select, and analyze integration patterns based on node attributes or pattern characteristics. The techniques disclosed support dynamic updates, automated governance, and compliance workflows, thereby streamlining the design, validation, and management of integration scenarios across complex computing environments.

20 Claims, 9 Drawing Sheets

Figure 2:
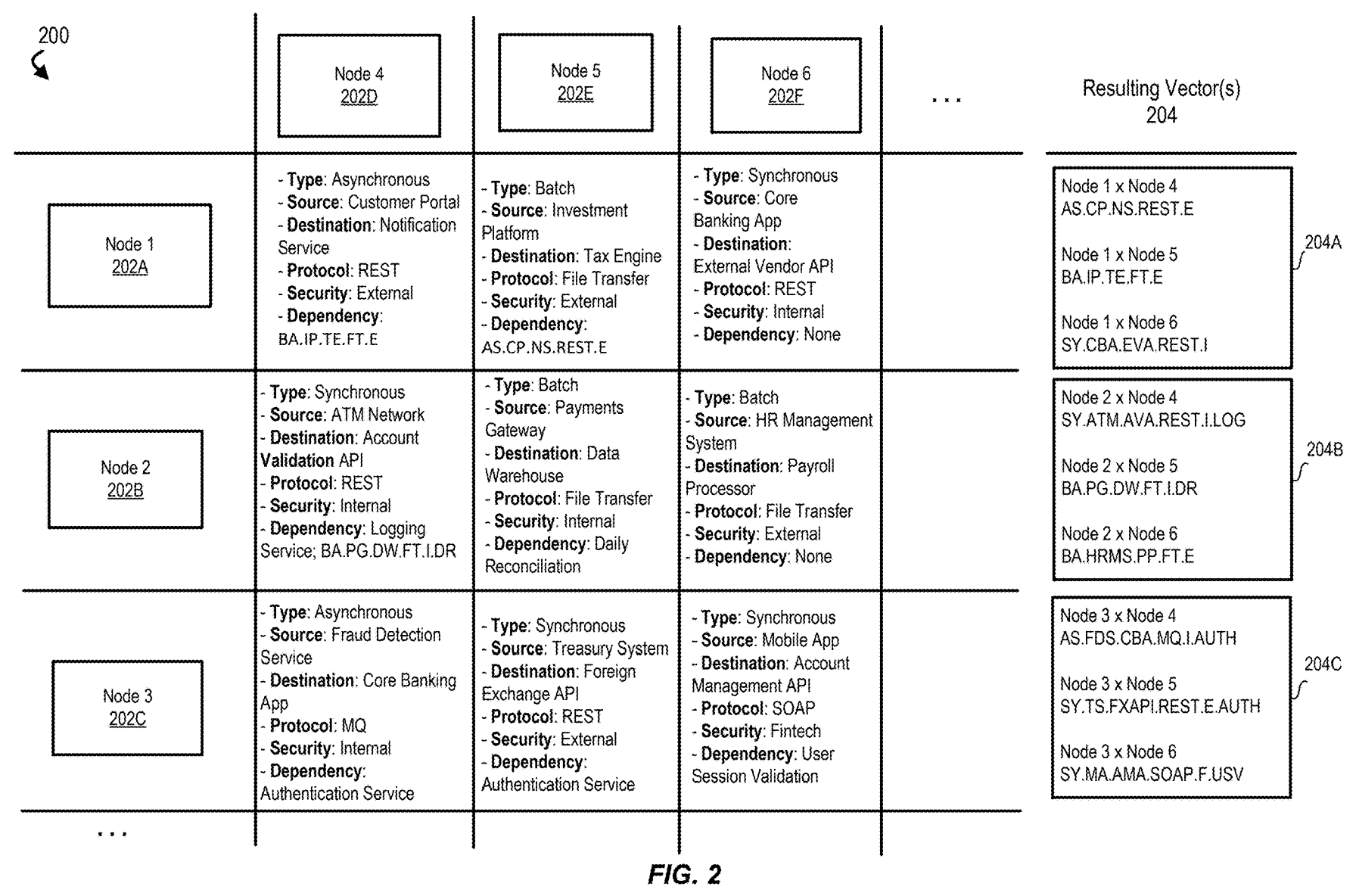

200

Node 1
202A

- Type: Asynchronous
- Source: Customer Portal
- Destination: Notification Service
- Protocol: REST
- Security: External
- Dependency: BA.IP.TE.FT.E

Node 2
202B

- Type: Synchronous
- Source: ATM Network
- Destination: Account Validation API
- Protocol: REST
- Security: Internal
- Dependency: Logging Service; BA.PG.DW.FT.I.DR

Node 3
202C

- Type: Asynchronous
- Source: Fraud Detection Service
- Destination: Core Banking App
- Protocol: MQ
- Security: Internal
- Dependency: Authentication Service

...

Node 4
202D

Node 5
202E

- Type: Batch
- Source: Investment Platform
- Destination: Tax Engine
- Protocol: File Transfer
- Security: External
- Dependency: AS.CP.NS.REST.E

Node 6
202F

- Type: Synchronous
- Source: Core Banking App
- Destination: External Vendor API
- Protocol: REST
- Security: Internal
- Dependency: None

- Type: Batch
- Source: Payments Gateway
- Destination: Data Warehouse
- Protocol: File Transfer
- Security: Internal
- Dependency: Daily Reconciliation

- Type: Batch
- Source: HR Management System
- Destination: Payroll Processor
- Protocol: File Transfer
- Security: External
- Dependency: None

- Type: Synchronous
- Source: Treasury System
- Destination: Foreign Exchange API
- Protocol: REST
- Security: External
- Dependency: Authentication Service

- Type: Synchronous
- Source: Mobile App
- Destination: Account Management API
- Protocol: SOAP
- Security: Fintech
- Dependency: User Session Validation

...

Resulting Vector(s)
204

204A

Node 1 x Node 4
AS.CP.NS.REST.E

Node 1 x Node 5
BA.IP.TE.FT.E

Node 1 x Node 6
SY.CBA.EVA.REST.I

204B

Node 2 x Node 4
SY.ATM.AVA.REST.I.LOG

Node 2 x Node 5
BA.PG.DW.FT.I.DR

Node 2 x Node 6
BA.HRMS.PP.FT.E

204C

Node 3 x Node 4
AS.FDS.CBA.MQ.I.AUTH

Node 3 x Node 5
SY.TS.FXAPI.REST.E.AUTH

Node 3 x Node 6
SY.MA.AMA.SOAP.F.USV

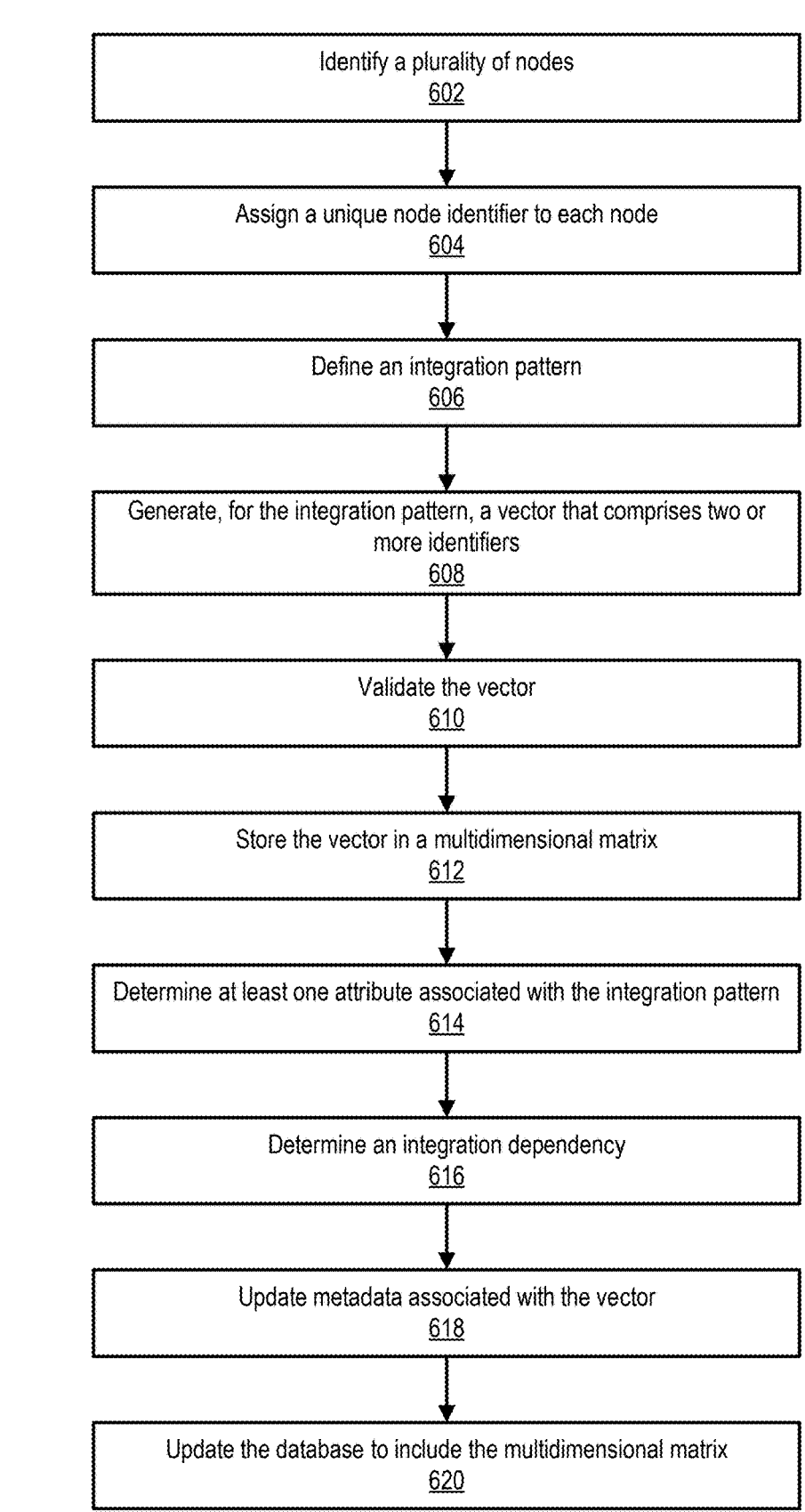

Identify a plurality of nodes
602

Assign a unique node identifier to each node
604

Define an integration pattern
606

Generate, for the integration pattern, a vector that comprises two or more identifiers
608

Validate the vector
610

Store the vector in a multidimensional matrix
612

Determine at least one attribute associated with the integration pattern
614

Determine an integration dependency
616

Update metadata associated with the vector
618

Update the database to include the multidimensional matrix
620

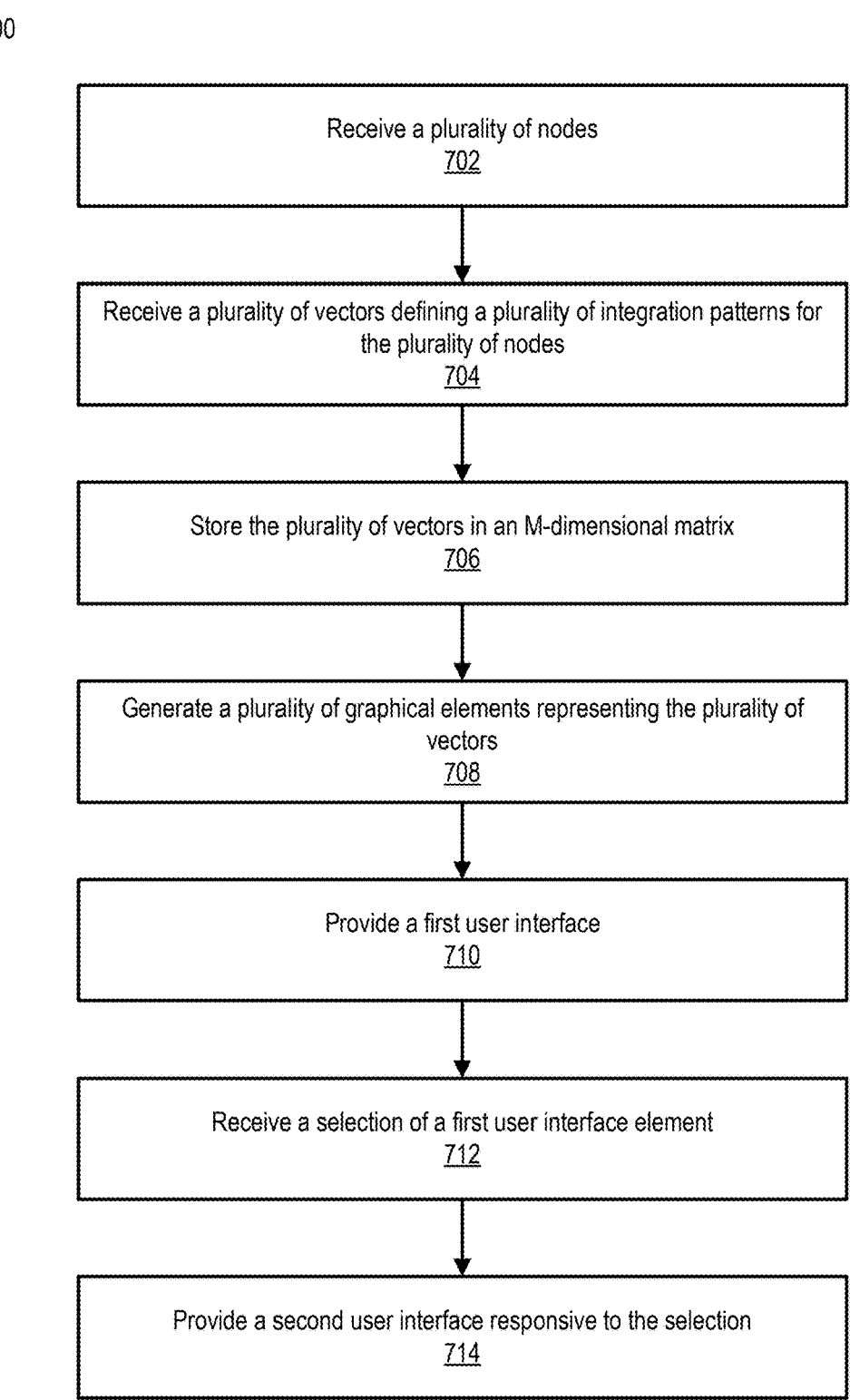

Receive a plurality of nodes
702

Receive a plurality of vectors defining a plurality of integration patterns for
the plurality of nodes
704

Store the plurality of vectors in an M-dimensional matrix
706

Generate a plurality of graphical elements representing the plurality of
vectors
708

Provide a first user interface
710

Receive a selection of a first user interface element
712

Provide a second user interface responsive to the selection
714

*FIG. 7*

PATTERN SELECTION FOR INTEGRATION ARCHITECTURE

CROSS-REFERENCE TO RELATED APPLICATION

This application is a continuation of U.S. patent application Ser. No. 19/389,840, filed Nov. 14, 2025, the entirety of which is hereby incorporated by reference.

TECHNICAL FIELD

This disclosure relates generally to systems and methods for generating, managing, and utilizing integration patterns to facilitate inter-application operability. The disclosure provides a structured, multi-dimensional organization of integration patterns, which is presented through an interactive user interface. This arrangement enables users to efficiently identify, filter, select, and perform other operations on relevant patterns based on the specific context and requirements of the application.

BACKGROUND

Many computational systems, especially in information technology (IT) environments, typically comprise a wide array of interconnected systems, applications, and platforms, each requiring secure, reliable, and efficient integration with other components. As organizations scale and evolve, the number and complexity of possible application and/or integrations increases, resulting in a proliferation of technical options, protocols, and business requirements. Entities are tasked with designing and documenting these integrations in a way that ensures consistency, compliance, and optimal performance across the enterprise.

Existing approaches to integration may often be ad hoc, decentralized, or reliant on lengthy documentation repositories (such as wikis or other types of documentation) that describe dozens of distinct integration patterns. These patterns may vary by communication type (e.g., synchronous or asynchronous), technical requirements (e.g., internal gateway, external API, fintech platform), and business context (e.g., data warehousing, customer-facing channel, vendor interface). Entities may need to manually sift through extensive pattern definitions to identify the appropriate pattern for a given scenario, which is time-consuming, error-prone, and can lead to inconsistent implementations. Furthermore, governance and compliance processes are complicated by the need for standardization and clear visualization of approved integration methods, which for complex systems often means requiring additional review and exception handling.

SUMMARY

Various examples are described including systems, methods, and devices relating to integration pattern generation and indexing within a multi-dimensional matrix. Various embodiments are described herein, including methods, systems, non-transitory computer-readable storage media storing programs, code, or instructions executable by one or more processors, and the like.

A system is provided for managing integration patterns among a plurality of nodes, each node corresponding to a unique computing entity within an environment. The system identifies the nodes and assigns a unique identifier to each. For every integration pattern, which defines a relationship between two or more nodes, the system generates a vector that includes identifiers for the participating nodes along with additional attributes such as protocol, security context, or data type. Each vector is validated using predefined logic to ensure that it satisfies approved integration pattern criteria. Once validated, vectors are stored and indexed within a multidimensional matrix alongside other integration patterns. Each vector is positioned in the matrix according to one or more defining pattern attribute values, such as node identifiers or pattern attributes. The system further determines and records integration dependencies and updates metadata for each vector accordingly. Both the multidimensional matrix and its associated metadata are stored in a database, enabling persistent and scalable management of integration patterns.

An interactive user interface is generated by the system, presenting the matrix as a multi-dimensional, interactive element. This interface enables users to filter, select, and retrieve information about integration patterns based on node identifiers, pattern attributes, or other criteria. Such a configuration streamlines the modeling, validation, and governance of integration scenarios, supporting efficient discovery and analysis of integration options across complex and heterogeneous computing environments.

Other embodiments of this invention include corresponding computer systems, apparatus, and computer programs recorded on one or more computer storage devices, each configured to perform the actions of the described methods.

BRIEF DESCRIPTION OF THE DRAWINGS

FIG. 2 is a diagram illustrating vector generation, in accordance with at least one embodiment;

FIG. 6 is a block diagram illustrating an example method for integration pattern generation, in accordance with at least one embodiment;

FIG. 7 is a block diagram illustrating an example method for generating a graphical user interface, in accordance with at least one embodiment;

DETAILED DESCRIPTION

Figure 1:
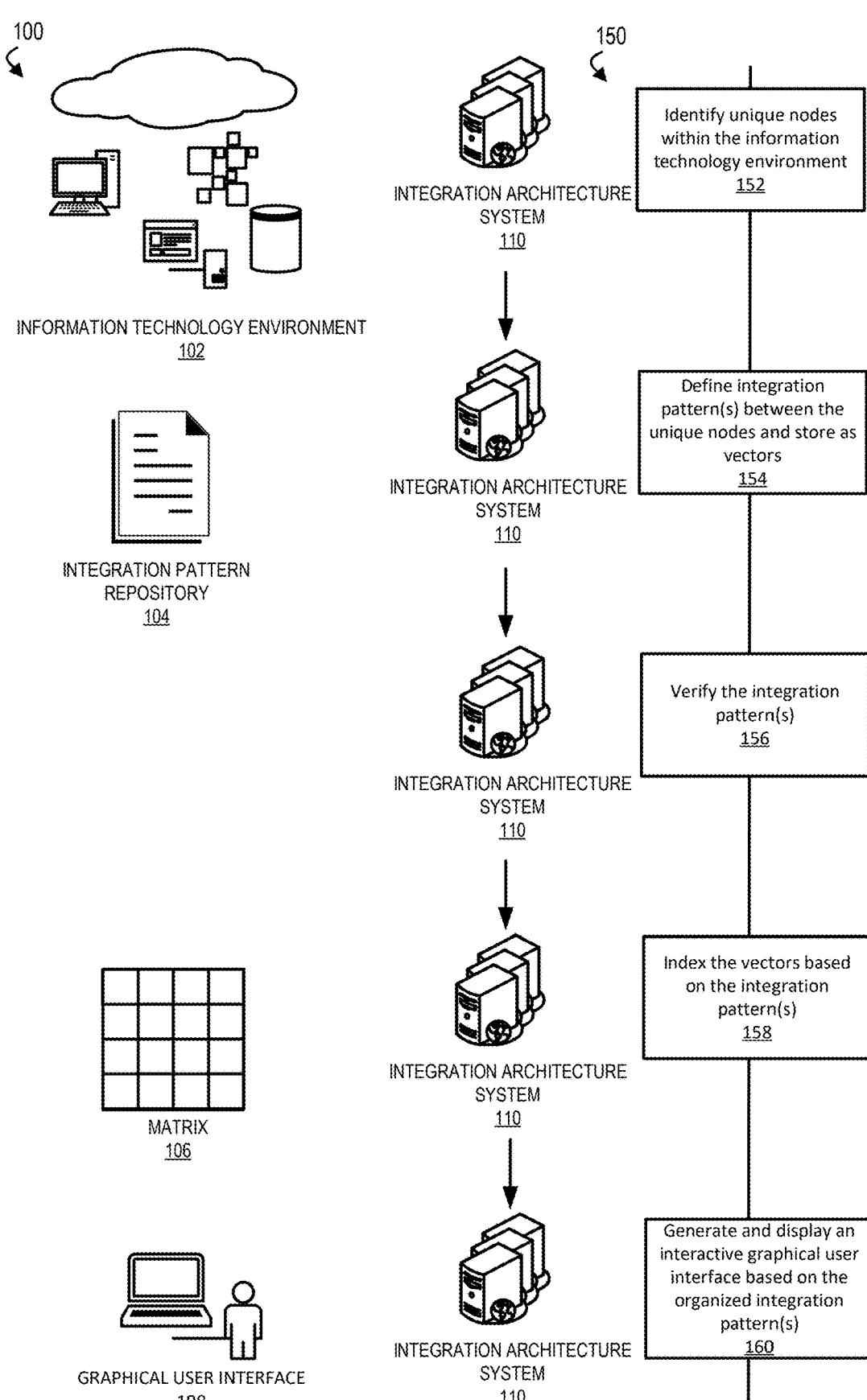
FIG. 1 is a flow diagram illustrating an example integration architecture system, in accordance with at least one embodiment.

To address challenges associated with the complexity, scale, and governance of numerous integration patterns, the disclosed technology provides techniques for organizing, presenting, selecting, and managing integration patterns. The solution introduces novel methods for arranging and managing these patterns within a multidimensional matrix.

In some embodiments, a graphical user interface visually displays the integration patterns as they are organized within the multidimensional matrix.

In the following description, various embodiments will be described. For purposes of explanation, specific configurations, and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Techniques described in the present disclosure relate to, among other things, methods, systems, devices, and computer-readable storage media for automating the systematic and scalable organization and selection of integration patterns in multidimensional environments. The present disclosure provides systems and methods for processing unique identifiers assigned to a plurality of nodes, where each node is associated with one or more system implementation patterns. These methods and systems can convert, using the unique identifiers, system implementation patterns into standardized representations (e.g., vectors), and employ algorithmic techniques to determine, validate, and manage integration patterns within a specific integration scenario and/or architectural schema. The disclosed methods and systems enable consistent, transparent, and repeatable selection of integration patterns from predefined lists linked to each attribute.

The system can automatically generate integration patterns based on the relationships and attributes of discovered nodes, enabling a comprehensive mapping of possible integrations. Additionally, entities such as IT architects can generate and implement integration patterns by defining specific relationships and attributes between selected nodes, ensuring that architectural decisions and custom requirements are reflected in the integration patterns. This approach allows for both automated and architect-driven creation and deployment of integration patterns that address the needs of the IT environment.

The techniques described herein may leverage machine learning, data analytics, and rule-based decision automation to address the complex challenge of integration pattern indexing within a multi-dimensional domain. These disclosed approaches enable the scalable and objective processing of nodes and/or integration patterns, the indexing of integration patterns within a multi-dimensional schema based on specified attributes, and the verification that integration patterns are implemented within a valid framework and satisfy designated implementation requirements (e.g., dependencies). The disclosed embodiments and framework for implementing these techniques are particularly advantageous in scenarios where manual or ad hoc verification methods are impractical, due to the combinatorial complexity arising from the large number of nodes and the numerous possible integration patterns, each with its own dependencies and attributes that must be respected. As a result, the disclosed techniques improve accuracy, consistency, and security across the IT environment.

Techniques described herein include outputting and/or storing the selected integration pattern(s) for downstream architectural or implementation tasks. For instance, the system can present the integration patterns and their associated attributes through a graphical user interface (GUI), allowing users (e.g., solution architects, technical managers, etc.) to view a comprehensive explanation detailing the selection and validation of integration patterns, including the specific rationale behind each assignment and the underlying decision-making process. In some embodiments, the integration patterns and relevant data may be stored, transmitted, and/or retrieved for further analysis and processing. For example, selected patterns and related metadata may be transmitted to internal or external systems (e.g., development teams, governance authorities, external partners) to facilitate implementation, compliance, or further review.

The graphical user interface described herein can enhance efficiency by aggregating integration patterns and their associated attributes in a centralized platform, enabling users to access all relevant information through a single interface. Traditionally, a requesting entity would be required to separately retrieve pattern data from multiple sources, each responsible for generating specific integration information. In contrast, the graphical user interface can streamline this process by automatically collecting both pattern data and their corresponding attributes for presentation to the user. As a result, the GUI can improve the operational efficiency of the computer system by eliminating the need for manual, individual requests to disparate resources, thereby consolidating and simplifying access to critical integration-related information.

The techniques described herein overcome the limitations of manual and ad hoc pattern assignment methods, providing a solution for environments requiring explainable, consistent, and repeatable determinations across a wide variety of integration scenarios and system types. Various embodiments are described herein, including methods, systems, and non-transitory computer-readable storage media storing programs, code, or instructions executable by one or more processors.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

I. Overview

Enterprises, particularly those operating at large scale, often rely on numerous interconnected systems, applications, platforms, and related components to transmit and receive data. Such interconnected systems are commonly present in information technology (IT) environments. Each component in this network typically requires secure and efficient integration with other components, which may be defined by integration patterns. As the size and diversity of such environments increase, operations such as the manual selection, implementation, validation, and management of approved integration patterns becomes increasingly complex and difficult to manage. Factors that contribute to increased difficulty and complexity include the need to manage and track dependencies that a given integration pattern may have on other integration patterns. The disclosed integration architecture system addresses these challenges by systematically processing, validating, and presenting integration patterns in a centralized, user-friendly manner.

The process can begin with the identification of unique nodes within a network, such as in an information technology environment. These nodes can represent the various systems, services, applications, platforms, and the like, that participate in integrations across the enterprise. Once the nodes are identified, the system can define possible integration patterns between them, drawing from a repository of approved implementation patterns. Each pattern can be encoded as a structured vector, capturing key attributes such as integration type, protocol, security context, and dependencies. The system may then verify each integration pattern to ensure compatibility, security, and compliance with organizational policies. In addition, the system may identify any potential dependencies required by the implementation, as well as any other implementation patterns that depend on it. Patterns that pass this validation may be incorporated into a multidimensional matrix, which organizes the patterns according to their technical and contextual attributes. This matrix can serve as the foundation for an interactive graphical user interface that enables architects, developers, and technical managers to efficiently filter, select, and explore available integration patterns. Through this intuitive interface, users can rapidly identify solutions that meet their specific requirements while ensuring consistency and governance across the system and for each integration pattern.

By automating the entire workflow (e.g., from node discovery and pattern definition to validation, organization, and interactive presentation) the integration architecture system can transform how enterprises manage integration complexity. The system disclosed herein is capable of managing the technical sequence of integration operations while also executing processes that support a comprehensive architectural strategy. While the embodiments discussed herein refer specifically to information technology (IT) environments, those skilled in the art will appreciate that the disclosed can be applied to networks of nodes in a variety of contexts. The framework enables organizations to efficiently manage complexity, maintain compliance, and adapt to future integration needs with consistency.

FIG. 1 is an example flow diagram illustrating an integration architecture system, in accordance with at least one embodiment. FIG. 1 includes an example flow 100 showing an example process 150 for, amongst other things, generating and managing integration patterns. Flow 100 may include information technology environment 102, integration pattern repository 104, matrix 106, graphical user interface 108, and integration architecture system 110. Information technology environment 102 may include systems and applications such as enterprise databases, web applications, external vendor APIs, data warehouses, gateways, or user-facing portals, and the like. Information technology environment 102 may be implemented using cloud infrastructure. Each node may be implemented using diverse technologies and protocols, such as REST APIs, SOAP services, message queues, event streaming platforms, or proprietary communication interfaces. Nodes may further be characterized by their deployment location, including on-premises data centers, public or private cloud environments, hybrid architectures, or via edge computing. Information technology environment 102 may be implemented using cloud infrastructure, such as Infrastructure as a Service (IaaS), Platform as a Service (PaaS), or Software as a Service (SaaS) offerings provided by cloud providers (e.g., Amazon Web Services, Microsoft Azure, Google Cloud Platform). Integration between nodes may involve secure communication channels (e.g., TLS/SSL-encrypted connections), identity and access management policies, and monitoring or logging systems to ensure compliance and security within information technology environment 102.

The process 150 may begin at block 152 by identifying unique nodes within information technology environment 102. These nodes may represent individual systems, applications, platforms, or services (collectively referred to as nodes) that require integration within the broader information technology environment 102. Each node can be assigned a unique identifier to ensure precise reference and traceability throughout the integration process. Identification of nodes may be performed by automated network discovery, querying system registries, or receiving manual input from entities, such as system administrators, IT architects, solutions architects, etc., and may be stored in a node catalog or registry, along with metadata such as system type, owner, and capabilities. Each node is assigned a unique identifier to facilitate precise mapping in subsequent steps and/or operations. For instance, a node may be assigned a human-readable acronym (such as "CBA" for Core Banking Application), a structured alphanumeric code (such as "WEBAPP-001" for a web application), or a serial number automatically generated by the system (such as "SYS10023"). In some embodiments, identifiers may comprise universally unique identifiers (UUIDs), such as "8e1b7a0e-6d8b-4c1b-9f1c-27a8b128e7af," which are generated to be globally unique and prevent collisions across distributed systems. Alternatively, identifiers may include network-specific information, such as IP addresses ("10.2.1.99") or domain names ("api.vendor.com"), allowing direct association with networked devices or endpoints.

Composite identifiers may also be used, combining multiple fields such as system name, department code, or operational region (for example, "HRMS-FINANCE-EAST"). Database keys or object IDs (e.g., "app_id:12345") may be employed for systems tied to enterprise databases, while hostnames or server labels ("REPORTSRV-03") can be used for infrastructure nodes. These identifiers can be generated automatically by the integration architecture system 110 during node discovery or assigned manually by system administrators (or other entities) in accordance with organizational naming conventions. In certain embodiments, identifiers may be validated for uniqueness using hashing algorithms, registry lookups, or database constraints. Metadata associated with each identifier may be stored in a central node catalog or registry, enabling precise mapping, management, and selection of nodes as part of the integration pattern generation and workflow depicted in FIG. 1.

At block 154, the integration architecture system 110 may define integration patterns between the identified unique nodes and store these patterns as vectors. Each integration pattern can capture attributes such as, but not limited to, integration type, communication protocol, security context, directionality, risk tolerance rating (e.g., "Red, Amber, Green" status indicator), and dependencies. These patterns are encoded into structured representations that can be processed and managed efficiently. For instance, the integration architecture system 110 can define integration patterns between these unique nodes and store each pattern as a vector. An integration pattern can specify an approved method or protocol for interaction between two or more nodes. Each pattern captures a set of attributes that may include integration type, such as synchronous, asynchronous, or batch; communication protocol, such as REST, SOAP, MQ, or file transfer; network type, such as internal, external, or fintech; directionality, such as inbound, outbound, publish, or subscribe; and dependencies, such as authentication services, logging mechanisms, or operational triggers. Patterns might be represented as ordered lists, key-value objects, or compact notation strings, and stored in a central repository, e.g., integration pattern repository 104, or multidimensional matrix.

In some embodiments, process 150 may store integration patterns that are generated by an entity, such as an IT architect, in integration pattern repository 104. These patterns can be created manually by architects based on their knowledge of enterprise requirements, best practices, specific business scenarios, and the like. Integration pattern repository 104 may also include integration patterns generated automatically by the integration architecture system 110, which identifies and codifies common or approved methods of interaction between nodes. The process of identifying possible integration patterns between the discovered nodes can involve systematically analyzing the set of nodes present within the information technology environment 102. For each pair or group of nodes, the integration architecture system 110 may consult the integration pattern repository 104 to determine which patterns are applicable. This determination may be based on several factors, including the technical capabilities of each node, such as supported communication protocols like REST, SOAP, MQ, or file transfer, as well as available security features or compatibility with specific integration types, such as whether it is synchronous, asynchronous, or batch integration types. The system also considers the network context, including the relative locations of the nodes within the organization's network topology, to assess whether integrations should occur internally within the enterprise network, externally across organizational boundaries to vendors or partners, or via specialized gateways designed for, as an example, fintech or compliance zones. Organizational policies, security requirements, regulatory constraints, and governance rules may further restrict or prescribe certain integration patterns between particular nodes. Additionally, various architectural considerations are taken into account, such as performance requirements including latency or throughput, scalability, reliability, fault tolerance, and any dependencies or prerequisites like authentication services, logging mechanisms, or operational event triggers.

For example, integration architecture system 110 may analyze a scenario in which a source node, such as an internal banking application, needs to integrate with an external vendor application node. To determine the appropriate integration pattern, integration architecture system 110 may consult integration pattern repository 104, which contains records of approved patterns for various node combinations. For the scenario involving these specific nodes, the system may identify that a synchronous publishing protocol, implemented via an internal API to the system of record (SoR) command topic on the enterprise event hub (EEH), is the approved integration pattern. Additionally, integration architecture system 110 may determine that this integration pattern, which connects the internal banking application with the external vendor application, has dependencies that must be satisfied before or during its implementation. Specifically, for this example, integration may only proceed if an asynchronous publishing protocol is also established, using an API on the internal application gateway to send messages to the SoR command error topic on the EEH. Alternatively, if the source node is a batch processing system, integration architecture system 110 may identify from integration pattern repository 104 that a file transfer pattern is the appropriate method for moving data to a reporting server. In this scenario, the integration is subject to additional dependencies, such as triggering the file transfer at the end of the day or upon completion of batch processing.

In some embodiments, more than one integration pattern may be identified for a given set of nodes. Integration pattern repository 104 may store multiple approved patterns applicable to the specific combination of source and destination nodes, each pattern reflecting different protocols, security levels, or operational requirements. Integration pattern repository 104 may also include metadata describing the conditions or scenarios in which each pattern is preferred, such as performance constraints, compliance requirements, or dependency relationships with other patterns. When integration architecture system 110 analyzes the nodes, it may present the available patterns to the user via a graphical user interface, enabling selection based on relevant attributes or business needs. Furthermore, the system may recommend or automatically select the optimal pattern based on contextual factors, such as data volume, latency requirements, or regulatory considerations. In some cases, the system may also require validation that all prerequisite patterns or dependencies have been satisfied before permitting implementation of the chosen integration pattern.

Once candidate patterns are identified, integration architecture system 110 may further filter or rank them based on architectural priorities, such as minimizing security risk, optimizing performance, or ensuring compatibility with existing infrastructure. Filtering may be performed using rule-based algorithms, machine learning models, or user-defined criteria, allowing for dynamic adjustment based on evolving enterprise requirements. The selected patterns can then be encoded as vectors containing the relevant attributes, such as integration type, protocol, security context, directionality (e.g., inbound, outbound, bidirectional, etc.), and dependencies, and stored in matrix 106 or other data storage structure for efficient organization and retrieval. This can allow the system to present only the valid and approved integration patterns for a given set of nodes and architectural consideration. In alternative embodiments, the system may also provide automated recommendations, generate configuration templates, or initiate workflow automation for downstream implementation tasks, such as kicking off provisioning resources or generating integration code snippets.

At block 156, the integration patterns may be validated. Integration architecture system 110 can perform validation of the integration patterns that have been defined between the identified nodes and stored as vectors. This validation process can ensure that each proposed integration pattern conforms to technical, security, organizational, or other relevant requirements before it is incorporated into matrix 106 and made available for implementation or selection via the graphical user interface 108 or for other downstream task. In some embodiments, pre-processing of the integration patterns may be required before validation may take place. This can include situations in which the integration pattern is received as user input in the form of text, which can include a natural language description, a dot notation string, a configuration script, or structured input such as JSON, YAML, or XML. Integration architecture system 110 may parse this user-submitted text to extract relevant attributes, including but not limited to integration type, protocol, nodes, dependencies, security context, and additional metadata. Then, natural language processing, schema-based parsing, or pattern recognition algorithms may be used to interpret and translate the user-submitted text into a standardized vector format. The standardized vector format then can ensure validation of the integration pattern is able to progress correctly.

The validation process may begin by applying a set of predefined validation rules and logic to each integration pattern vector. These rules may include, for example, verifying that the communication protocol specified in a given integration pattern is supported by both the source and destination nodes. In some embodiments, the integration pattern may involve more than two nodes, and the system must validate protocol compatibility across all nodes in the set. For instance, if a pattern specifies the use of the REST protocol, the integration architecture system checks that each participating node is capable of transmitting and receiving RESTful API requests and responses. In addition to protocol compatibility, the system also confirms that the selected integration type (whether synchronous, asynchronous, or batch) aligns with the operational constraints and business requirements of each node involved. This may include evaluating whether all nodes can support the necessary timing and coordination for synchronous interactions, handle event-driven asynchronous messaging, or participate in scheduled batch data exchanges as required by the integration scenario.

Security context and compliance validation can be a part of the process 150. Integration architecture system 110 may assess whether the integration pattern's security designation (internal, external, fintech, etc.) complies with the organization's security policies and whether any additional safeguards, such as encryption, authentication mechanisms, or network segmentation, are required (for example, TLS/SSL for data in transit or encryption at rest), and that endpoints are authenticated using organization-approved identity management solutions, such as OAuth, SAML, or certificate-based access. For integration patterns involving, for example, external or fintech networks, integration architecture system 110 may validate that the proposed data exchange adheres to regulatory standards, such as those required for financial transactions or privacy-sensitive data. Additionally, the validation process may include confirming that the integration pattern specifies appropriate access controls, such as role-based access or least-privilege permissions, and that network segmentation policies are enforced to isolate sensitive environments. Integration architecture system 110 can further check that third-party risk assessments have been completed and that data sovereignty requirements are satisfied, particularly if integration involves cross-border data transfers. In some embodiments, integration architecture system 110 may generate compliance reports or checklists as part of the validation workflow, and may automatically notify security or compliance entities if manual review or approval is required for high-risk integrations. The results of the security and compliance validation can be stored as metadata associated with the pattern, enabling ongoing governance and facilitating periodic reviews or audits.

Directionality and dependencies may also be validated during process 150 by integration architecture system 110. Integration architecture system 110 can check that the direction of data flow (e.g., inbound, outbound, publish, subscribe, etc.) is allowable given the roles and permissions associated with the source and destination nodes. This may include verifying that the source node is authorized to transmit data to the destination node under current access control policies, and that the destination node is authorized to accept or process data of the relevant type and volume. For scenarios involving publish/subscribe architectures, the system may ensure that the subscribing node has valid subscriptions to the required topics or channels, and that topic-specific permissions and message retention policies are correctly configured. Any dependencies specified in the integration pattern, such as reliance on a separate integration pattern, authentication service, logging mechanism, operational trigger, or supporting microservice, can be flagged by integration architectures system 110 to ensure it is implemented into the overall integration scenario. Integration architecture system 110 may check that all prerequisite components (e.g., identity providers, token issuers, or monitoring agents) are correctly provisioned and available in the target environment. If the integration pattern requires that data must be authenticated before it is logged or that a trigger event must occur before data transfer, the integration architectures system 110 can validate that these process dependencies are modeled and enforced within the workflow. In addition, integration architectures system 110 can evaluate version compatibility, ensuring that dependent services (e.g., authentication APIs or logging endpoints) are running versions that support the required integration pattern. In some embodiments, the validation process may include cross-referencing the pattern against a repository of approved or prohibited integration patterns, flagging any instances where the proposed pattern conflicts with governance rules or organizational standards. The system may also evaluate performance and reliability metrics, such as anticipated latency, throughput, and fault tolerance, based on historical data or simulated execution.

If the integration pattern satisfies all applicable validation criteria, integration architecture system 110 can mark it as approved and prepare it for inclusion in the matrix 106. Integration patterns that do not pass validation may be flagged for review, revision, or escalation to system architects or governance authorities for further assessment. The validation status, along with any relevant audit logs or error messages, may be stored as metadata within the integration pattern's vector for traceability and compliance purposes. As part of preparing the validated integration pattern for inclusion in matrix 106, the validated integration pattern may be converted into a standardized vector representation. This conversion may involve encoding the integration pattern's attributes (such as integration type, protocol, source and destination nodes, security context, directionality, dependencies, validation status, and relevant metadata) into a multi-dimensional array, tuple, object structure, or other suitable means. Each dimension or field of the vector may correspond to a distinct attribute, enabling efficient indexing, retrieval, and analysis.

In one embodiment, the vector can be encoded using a dot notation format where each character or sequence of letters separated by a delimiter (such as a period or dot) corresponds to a distinct attribute of the integration pattern. For example, a dot notation string such as "AS.CF.E" may be used, where the first segment ("AS") represents the integration type or method (e.g., asynchronous), second segment ("CF") identifies the protocol or mechanism (e.g., Command Forwarding), and the third segment ("E") designates the security context, such as external, internal, or fintech. Each integration pattern can thus be abstracted as a sequence of attribute codes, with the position of each segment within the dot notation indicating an order of operation or other attribute. When the integration pattern is stored in matrix 106, the underlying data structure may treat the dot notation string as a vector or key. The matrix 106 itself can be implemented as a multi-dimensional array, a relational database table, or a graph data structure, where each dimension or column aligns with a specific attribute (e.g., integration type, protocol, security context, directionality, dependency, etc.). The dot notation vector can serve as both a human-readable and machine-interpretable identifier, facilitating efficient organization, retrieval, and cross-referencing of integration patterns within the system. In addition to the core dot notation, the vector stored in matrix 106 may include supplemental metadata fields, such as validation status, creation or modification timestamps, user identifiers, audit logs, or references to documentation.

At block 158, the vectors may be indexed based on the integration pattern. The integration architecture system 110 may organize the verified integration pattern vectors based on their respective attributes and relationships, which can allow for efficient retrieval, filtering, and presentation in subsequent steps. This organization process can involve structuring the vectors within matrix 106, which can serve as a central repository and visual framework for managing the set of approved integration patterns. Matrix 106 may be implemented as a multidimensional matrix, array, relational database table, or other suitable data structure capable of indexing the pattern vectors according to multiple key attributes. Each dimension of matrix 106 can correspond to a specific attribute of the integration pattern, such as integration type (for example, synchronous, asynchronous, or batch), communication protocol (such as REST, SOAP, MQ, file transfer), security context (internal, external, fintech), directionality (inbound, outbound, publish, subscribe), and dependencies (such as required services or triggers). For example, matrix 106 may be arranged so that each row represents a particular integration type, while each column indicates a specific communication protocol. Additional axes or layers may encode security context and directionality, allowing for rapid cross-reference and selection of patterns that meet the user's criteria. Integration pattern vectors can be assigned positions within the matrix based on their attribute values, ensuring that similar or related patterns are grouped together and that filtering operations can be performed efficiently. Additional dimensions within the matrix may be visually represented by techniques such as color-coding, which can be used to distinguish different categories, types, or varietals within a given dimension. For example, integration patterns that share the same protocol or security context may be assigned specific colors, enabling users to quickly identify and differentiate between similar patterns when viewing a visual representation of matrix 106. This visual differentiation can enhance the ability to organize, filter, and select integration patterns based on multiple attributes, supporting more intuitive and efficient navigation within a graphical user interface, which will be described in more detail below.

The organization process may also include indexing integration pattern vectors with metadata such as pattern identifiers, descriptive names, approval status, version information, and links to supporting documentation. This metadata enables traceability, auditability, and governance, and also facilitates advanced search and filtering capabilities within graphical user interface 108. In some embodiments, integration architecture system 110 may employ algorithmic techniques to cluster or categorize patterns into higher-order groupings, such as "families," "molecules," or "composite integrations," that reflect common architectural solutions, dependencies among integration patterns, or viable substitutes for specific integration patterns. Integration patterns with dependencies or prerequisite relationships may be linked within the matrix so that, when a pattern is selected in a user interface, related integration patterns or required supporting integrations are surfaced to the user.

At block 160, the integration architecture system 110 can generate and display an interactive graphical user interface (GUI) 108. This step leverages the organized set of verified integration pattern vectors stored in matrix 106 and transforms them into a visual, user-friendly format that enables intuitive exploration, selection, and management of integration patterns. The graphical user interface may be implemented as a web-based dashboard, desktop application, or other software client accessible by users such as IT architects, solution designers, technical managers, compliance officers, and the like. Upon initialization, GUI 108 may retrieve the organized pattern vectors from matrix 106, including their core attributes, such as integration type, protocol, security context, directionality, dependencies, and any relevant metadata (e.g., approval status, descriptive names, documentation links).

To facilitate efficient navigation and decision-making, GUI 108 may visually arrange the integration patterns according to their multidimensional attributes. This arrangement may take the form of a grid, table, or periodic-table-style layout, where each cell, row, or column corresponds to a particular combination of pattern attributes. The interface may employ color-coding, icons, borders, or other visual cues to differentiate between categories, types, or security contexts, allowing users to quickly scan and identify patterns that fit their integration scenario. The interactive features of GUI 108 can allow users to filter patterns based on desired criteria. For example, an architect may select filters for "asynchronous," "REST protocol," and "external security context," causing the interface to highlight only those patterns that match the selected attributes while dimming or hiding irrelevant options. Users can also sort patterns by attribute, search by keyword, or view grouped "families" or composite "molecules" of patterns that represent common architectural solutions. Selecting a particular integration pattern within GUI 108 may reveal detailed information, such as the source and destination nodes, a summary of technical requirements, protocol specifications, security considerations, and any dependencies or prerequisites (e.g., required logging service, authentication mechanism, or operational triggers). The GUI 108 may provide hyperlinks to further documentation, implementation guides, or approval workflows, supporting end-to-end traceability and compliance. GUI 108 may also provide a graphical user element capable of receiving user input in the form of natural language description.

In some embodiments, the GUI may allow users to visualize the relationships between nodes and patterns as diagrams, flowcharts, or topology maps, showing how selected patterns would fit into the broader architecture. Users may also initiate downstream actions, such as exporting pattern specifications, generating configuration templates, or notifying relevant stakeholders of selected integrations. By consolidating and presenting all validated and organized integration patterns within a single interactive platform, the graphical user interface significantly streamlines the architect's workflow. It can eliminate the need for manual cross-referencing of disparate documents, reduces the risk of selecting incompatible or unapproved integration methods, and enhances the transparency and repeatability of architectural decisions. The GUI may support both automated and architect-driven integration pattern selection, providing flexibility to address routine integrations as well as custom, complex scenarios within the information technology environment 102.

II. Vector & Matrix Generation

By representing integration patterns as vectors and organizing them within a multi-dimensional matrix, the system can enable systematic and scalable management of complex integration scenarios across diverse environments such as information technology environments. Each vector may encode the essential attributes and/or nodes of an integration pattern in a standardized format, while the matrix structure can position and store these vectors according to relevant classification criteria, such as node identities, integration pattern attributes, and the like. This approach can allow for efficient indexing, retrieval, and cross-referencing of integration patterns, support advanced search and filtering capabilities, and enable entities to quickly identify, compare, and select valid integration patterns for a given scenario. As a result, the use of vectors and matrices can provide for a robust foundation for maintaining architectural consistency, ensuring compliance, and streamlining the design, validation, and deployment of integrations within complex organizational networks.

FIG. 2 is a diagram illustrating vector generation 200, in accordance with at least one embodiment. FIG. 2 illustrates a table in which nodes 202A-202C are arranged along the rows and nodes 202D-202E are arranged along the columns. The intersections of these row and column nodes yield corresponding vectors 204A-204C, each representing an example of a resulting integration pattern.

Each node 202A-202F can be representative of a distinct system, application, service, or platform within an information technology environment. Within the table, the intersection of a given row node and column node corresponds to a unique integration pattern between those two nodes. For each intersection, relevant integration attributes are specified, including, but not limited to: type, source, destination, protocol, security, and dependency. Type may refer to the integration mode (e.g., asynchronous, synchronous, batch, etc.), source may refer to the originating system (e.g., application, service, etc.), destination may refer to the target system (e.g., application, service, etc.), protocol may refer to the communication protocol used (e.g., REST, MQ, SOAP, file transfer, etc.), security may refer to the security/compliance context (e.g., internal, external, fintech, etc.), and dependency may refer to any operation or technical prerequisites required for the integration (e.g., integration pattern, message queue, logging service, authentication, etc.).

Attributes for each integration pattern scenario can be encoded as resulting vectors 204A through 204C, which are displayed to the right of the table. Each vector may be generated by combining the node identifiers and/or attribute values from the intersecting nodes into a standardized dot notation string. In this notation, each segment separated by a period represents a specific attribute such as integration type, source, destination, protocol, security context, or dependency. For instance, when Node 1 202A is integrated with Node 4 202D, the resulting vector "AS.CP.NS-.REST.E", as depicted in resulting vector 204A, captures the fact that this integration pattern is asynchronous, originates from the customer portal, targets destination node notification service, uses the REST protocol, applies an external security context. Although not depicted as part of the resulting vector, integration of Node 1 with Node 4 is shown to depend on the integration pattern "BA.IP.TE.FT.E," which is stored as metadata and used to signal the dependency requirement. Similarly, integration of Node 1 with Node 5 may include metadata indicating its dependence on the integration of Node 1 with Node 4. As another example, integrating Node 2 202B with Node 5 202E produces the vector "BA.PG.DW.FT.I.DR," which reflects a batch integration from the payments gateway to the data warehouse, using file transfer protocol, under an internal security context, and dependent on daily reconciliation.

Additionally, attribute values within the vector can themselves reference other nodes within the information technology environment, particularly when the integration between two or more nodes must traverse an intermediary node. For example, if integration between Node 1 202A and Node 4 202D requires routing data through Node 3 202C, which serves as an API for the purposes of this example, the resulting vector may be "AS.CP.NS.REST.E.N3," where "N3" denotes Node 3 202C as a required intermediary for the integration between Node 1 202A and Node 4 202D.

In some embodiments, the integration patterns may be modified, such as adding, replacing, or removing nodes and/or attributes from the integration pattern. When a modification is made, the integration architecture system can update the corresponding vector to reflect the new or revised integration pattern. For example, if an additional node is inserted as an intermediary between the source and destination nodes, such as routing data through a validation API or an authentication service, the vector is updated to include an additional segment representing the new node or service. Conversely, if a dependency is removed, such as eliminating the requirement for integration with a certain API, the corresponding attribute segment is deleted from vector and matrix 106 can be updated accordingly. The modification may be propagated and reflected throughout the system so that any integration patterns with dependencies on the updated integration pattern are also revised and/or modified to reference the updated integration pattern. Additionally, version control may be applied to modified vectors, maintaining a history of changes to integration patterns for audit and traceability purposes to allow for the system to revert to previous versions if needed, or to compare current and prior integration patterns for governance reviews.

Each resulting vector can uniquely identify an integration pattern for a specific source and destination node pairing, capturing the relevant technical and operational attributes necessary for implementation. As discussed herein, the integration patterns vector can be organized within matrix 106, or other suitable means, allowing for efficient retrieval, indexing, and management. This structured approach enables the system to present only valid and approved integration patterns to IT architects and technical managers, which streamlines the design, validation, and deployment of integrations in complex enterprise environments. The indexing of vectors within the matrix may follow a predetermined schema in which the vectors are placed in the matrix according to certain attributes, as will be further discussed below.

Figure 3:
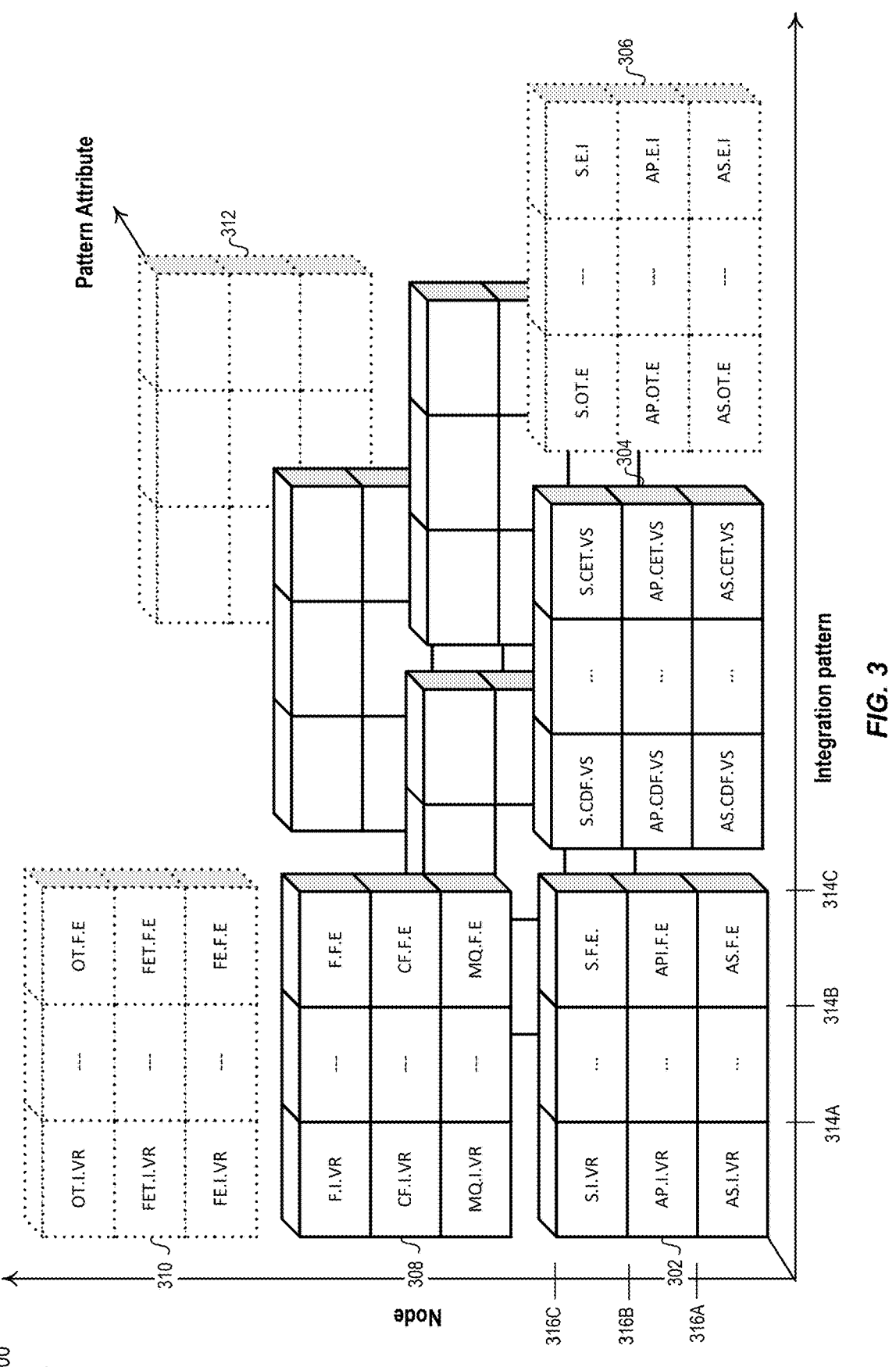
FIG. 3 is a diagram illustrating the indexing and storing of vectors within multi-dimensional matrices, in accordance with at least one embodiment.

FIG. 3 is a diagram illustrating the indexing and storing of vectors within multi-dimensional matrix 300, in accordance with at least one embodiment. Matrix 300 depicts an organizational structure for integration patterns, where each integration pattern is encoded as a vector and positioned within a multi-dimensional space based on node identifiers/attributes, pattern attribute, and integration pattern. It should be noted that while matrix 300 is depicted as spanning 3 axes, this is in no way limiting and any number of axes and dimensions can be possible.

Within matrix 300, each axis corresponds to a different classification or attribute relevant to an integration pattern.

For example, the vertical axis labeled "Node" may represent the source or destination system, application, or service involved in the integration, or any entity within the information technology system requiring connectivity. The horizontal axis labeled "Integration Pattern" can indicate the type of integration or the method employed, such as synchronous, asynchronous, file transfer, or message queue. Additional axes or dimensions, as illustrated by the diagonal depth of the matrix labeled "Pattern Attribute", may represent further pattern attributes, including protocol, security context, or dependency requirements. Each cell or entry within the matrix can contain a vector, which may be represented by a compact, dot notation string encoding the key attributes and/or nodes of a specific integration pattern. For ease of reference, tick marks 314A-314C along the horizontal "Integration Pattern" axis and tick marks 316A-316C along the vertical "Node" axis have been added for illustrative purposes and for ease of reference when describing FIG. 3. In addition, the axes are not limited to the tick marks 314A through 314C and 316A through 316C; rather, each axis can include any number of tick marks as needed to accommodate the number of nodes or integration patterns being represented.

Matrix 300, as depicted, may include multiple sub-matrices, labeled 302-312. These sub-matrices represent clusters or groupings of integration patterns that share common attributes, dependencies, or architectural features, and are visually separated for clarity and ease of reference during discussion. In addition, sub-matrices 302-312 are depicted as separated sub-matrices for visual clarity and ease of reference during the discussion herein. The dotted outlines around sub-matrices 306, 310, and 312 signify that the multi-dimensional matrix 300 can include any number (N) of these sub-matrices. This visual representation highlights the extensibility of multi-dimensional matrix 300, allowing it to accommodate additional clusters or groupings of integration patterns as needed.

While the focus of the following discussion will center on sub-matrix 302, it should be understood that the description for sub-matrix 302 can extend to sub-matrices 304-312. Sub-matrix 302 depicts how integration pattern vectors are organized and indexed within the larger multi-dimensional matrix 300. Within sub-matrix 302, the vertical axis can represent different nodes, which may correspond to systems, services, or applications that participate in the information technology environment. The horizontal axis can denote variations in the integration pattern, such as the specific method, protocol, security context, or dependency relevant to each scenario. As one traverses horizontally across the sub-matrix, the initial segment of each vector remains the same for a given row, reflecting a fixed originating node. For example, at tick mark 316A on the vertical axis, the initial segment of every vector in that row is "AS," and moving from left to right across tick marks 314A, 314B, and 314C, the remainder of each vector changes to represent different attributes or endpoints, while "AS" remains constant. This illustrates that for a fixed node, the system can enumerate all possible integration patterns by varying only the integration pattern-specific attributes along the horizontal axis. When moving vertically from one row to another, such as from 316A to 316B, the initial segment of the vectors changes from "AS" to "AP," reflecting a different originating node for that row. Similarly, moving vertically again from 316B to 316C, the initial segment of the vectors changes from "AP" to "S," reflecting another different originating node for that row. Despite this change, the overall structure and sequence of the subsequent segments in the vectors mirror those in the previous row, demonstrating that the possible pattern variations are consistently applied across different nodes. For instance, the vector at row 316B and column 314A begins with "AP" rather than "AS," but the remainder of the vector aligns with the pattern structure seen in the row below. This systematic arrangement can enable efficient enumeration, selection, and comparison of integration patterns, as vectors within the same row share the same initial segment and differ only in subsequent attributes, while vectors within the same column share similar pattern attributes across different nodes. Sub-matrices 304, 306, 308, 310, and 312 may exhibit similar properties when traversing one of the "Node," "Integration Pattern," and/or "Pattern Attribute" axes.

In addition to or alternatively, sub-matrices 302-312 can be used to illustrate alternative groupings, pattern "families," or clusters of patterns that share common architectural characteristics, dependencies, or operational requirements. For example, one sub-matrix could represent all integration patterns that utilize a particular protocol or security context, while another sub-matrix could encapsulate a set of patterns that collectively form a standard workflow or business process, such as onboarding, payment processing, or regulatory reporting. These higher-order groupings can reflect "composite integrations" described in the transcript, where a combination of individual integration patterns is required to fully implement a business capability or architectural function. In such cases, the sub-matrix may not only catalog the individual patterns but also encode the relationships and dependencies between them. In some embodiments, the sub-matrices may be organized to facilitate governance and compliance activities. For instance, sub-matrix 302 could be dedicated to integration patterns that require heightened security controls or regulatory approval whereas sub-matrix 304 may contain integration patterns that do not require security controls. Alternatively, sub-matrices can be constructed based on performance or scalability characteristics, enabling the comparison and selection of integration patterns that meet specific development requirements.

In some embodiments, sub-matrices 302-312 may be dynamically generated or updated as new patterns are added and/or removed, or as existing integrations patterns are modified based on changes in technology, business rules, compliance standards, and the like. The system could use clustering algorithms, machine learning, or user-defined rules to automatically categorize patterns into these groupings. Furthermore, multi-dimensional matrix 300 can aid in the visualization of architectural evolution and technology adoption across the organization. By analyzing the composition and usage of various sub-matrices 302-312, entities can identify trends, gaps, or redundancies in integration approaches. The multi-dimensional matrix 300 also may allow the system to maintain relationships between integration patterns. For example, if one integration pattern is a prerequisite for another, their respective vectors can be linked within multi-dimensional matrix 300, allowing the system to surface dependencies and guide users in selecting compliant and complete solutions.

The indexing of vectors within the multi-dimensional matrix 300 as discussed herein can allow for efficient indexing, search, and retrieval. By systematically encoding each integration pattern as a vector and positioning it in the matrix according to its defining attributes, such as node identity, integration method, protocol, and security context, the system can allow for identification and cross-referencing of patterns that meet specific architectural or operational requirements. This structured approach not only may accelerate the process of finding valid and approved integration patterns, but also can support complex queries, automated governance, and the scalable management of large and diverse integration environments.

III. Graphical User Interface

The vectors and matrices described herein can provide a structured foundation for generating a graphical user interface (GUI) that enables intuitive and efficient management of integration patterns. By leveraging the standardized encoding of integration attributes within vectors and their systematic organization within a multi-dimensional matrix, the GUI can present users with a comprehensive, interactive catalog of available integration patterns. Filtering functions within the interface can allow users to specify a set of source and destination nodes or other relevant criteria, enabling the system to dynamically surface only those integration patterns that are valid and approved for the selected context. This approach not only may streamline the process of identifying suitable integration strategies but also may help enforce architectural standards and compliance, ensuring that users are guided toward optimal, complete, and secure integration solutions tailored to their specific requirements.

Figure 4:
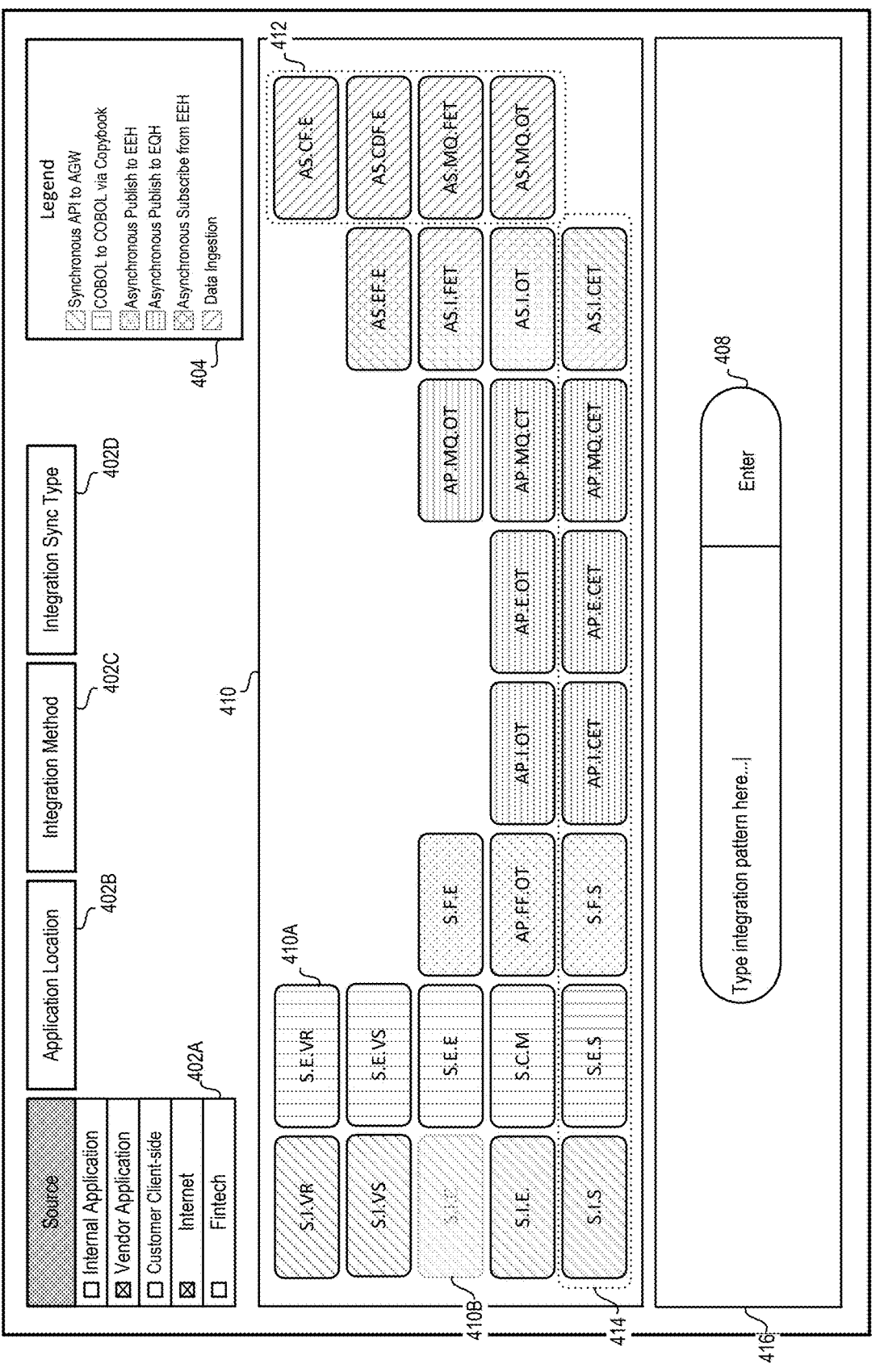
FIG. 4 is a diagram illustrating an example graphical user interface, in accordance with at least one embodiment.

FIG. 4 is a diagram illustrating an example graphical user interface 400, in accordance with at least one embodiment. Graphical user interface 400, herein also referred to as GUI 400, may comprise filter elements 402A-402D, legend 404, first user interface 410, and second user interface 416. First user interface 410 may include one or more first user interface elements, such as first user interface graphical element 410A and 410B (herein referred to as graphical element 410A and graphical element 410B). Second user interface 416 may include user input element 408.

First user interface 410 may include graphical elements such as graphical elements 410A and 410B. Additionally, first user interface 410 may arrange the graphical elements according to a multi-dimensional matrix layout that underlies the integration pattern vector indexing, such as that represented by multi-dimensional matrix 300 of FIG. 3. In this arrangement, each graphical element may correspond to a specific integration pattern vector and rendered on first user interface 410 based on the respective integration pattern's attributes and/or its position in the multi-dimensional matrix. This matrix-based layout visually organizes integration patterns by relevant classifications (e.g., node identity, integration method, protocol, security context, etc.) and can allow users to intuitively navigate, compare, and select integration patterns based on their structural relationships within the system. For example, graphical elements may be displayed in a grid or matrix structure, with one axis corresponding to node identity (such as source or destination systems) and another axis corresponding to integration pattern attributes (such as protocol, security context, or method).

Grouping 412 depicts a collection of graphical elements found in the same column. The collection of graphical elements may be positioned in the same column according to a shared integration pattern attribute, such as protocol, security context, another defining feature of the integration pattern, a shared node, a common metadata value, or other relevant criteria. In some embodiments, grouping 412 may represent higher-order groupings of integration patterns, such as those found within a sub-matrix of the multi-dimensional matrix (for example, sub-matrix 302 in FIG. 3) or other sub-groupings within the matrix, such as integration patterns that depend on one another. To illustrate, and as depicted in first user interface 410 and by grouping 412, each graphical element in the column reflects an integration pattern with a common initial node/attribute, "AS." This arrangement can correspond to the grouping of integration patterns for the source node "AS" within the multi-dimensional matrix. Grouping 412 can display all possible integration patterns available for source node "AS" within the information technology environment. Furthermore, this grouping can allow users to quickly identify the full set of nodes that can be integrated with "AS" as the source node, facilitating architectural analysis, pattern selection, and the identification of available or required integration scenarios in a systematic and visually intuitive manner.

Grouping 414 depicts a collection of graphical elements aligned within the same row. The graphical elements in grouping 414 may be positioned according to a shared attribute, such as protocol, security context, another defining feature of the integration pattern, a common node, or other relevant criteria. For example, each graphical element in grouping 414 may correspond to an integration pattern that satisfies the same level of security requirements, regardless of whether the integration pattern are categorized under "internal," "external," or "fintech" security contexts. This row-based organization allows users to quickly identify and compare all integration patterns within the information technology environment that are categorized under a particular security level, ensuring that only those patterns meeting the specified requirements are surfaced for review and selection. Furthermore, this arrangement may allow users to analyze how a particular node participates across multiple integration scenarios, as each row may show the full set of integration patterns available for that node, with variations in protocol, security context, dependencies, or other attributes presented along the horizontal axis. This supports comprehensive architectural analysis, making it easier to assess which integration patterns are approved, compliant, or optimal for a given node. Users can also identify gaps where no approved integration exists for a particular combination of node and security requirement, or spot redundant patterns that could be consolidated.

Additionally, the graphical elements may be visually distinguished through color, shading, or other graphical indicators to reflect relationships based on shared attributes or classifications. By visually grouping related elements in this manner, the interface enables users to more easily navigate and compare integration patterns according to their architectural classification, dependencies, or operational roles within the organizational framework. This visual arrangement can allow for intuitive understanding of the underlying relationships between integration patterns, allowing users to quickly identify clusters, families, or alternative integration patterns that may be relevant to a particular integration scenario.

GUI 400 may include one or more filter elements, for example, filter elements 402A-402D, which can enable users to specify one or more criteria relevant to the selection of integration patterns. Each filter element may correspond to a particular attribute or classification, such as source node, destination node, integration method, protocol, security context, dependency, or any other metadata associated with the available integration patterns. Users may interact with filter element 402A-402D by selecting desired values, ranges, or categories, which may be presented as dropdown menus, checkboxes, sliders, or other interactive user interface components. Upon receiving a user selection through any combination of filter elements, GUI 400 communicates with the underlying integration pattern repository or matrix to identify patterns whose metadata or associated data satisfy the specified criteria. GUI 400 then may dynamically update to display only the graphical elements (e.g., icons, tiles, rows, etc.) that represent integration patterns matching the user's selection. This dynamic filtering approach can provide an intuitive and efficient mechanism for narrowing down large sets of integration patterns, allowing users to identify valid and approved options for a given environment, such as an information technology environment.

For example, the "Source" filter element 402A may provide a dropdown menu with selectable options for the user. When the user makes a selection, the system can evaluate the available integration patterns against the chosen criteria. Graphical elements representing integration patterns that do not satisfy the selected options are visually indicated as such. For instance, as illustrated by graphical element 410B, which corresponds to an integration pattern that does not meet the criteria specified by the user, the element may be displayed in a grayed-out state. This visual cue can allow users to distinguish which integration patterns are applicable based on their filter selections, thereby streamlining the process of identifying valid and relevant integration options within the user interface.

GUI 400 may include second user interface 416, which may further include a user input element 408. User input element 408 can be configured to allow users to input a natural language text description of an integration pattern that they wish to define or validate. The user input element 408 can take the form of a text box, rich text editor, or similar component, where users can describe the integration scenario in plain language, specifying attributes such as the source and destination nodes, integration method, protocol, security requirements, dependencies, and any other relevant details. Upon receiving the user's natural language description or other similar input, second user interface 416 may then interface with backend processing components that employ natural language processing (NLP), parsing algorithms, or rule-based engines to extract attributes and/or nodes from the submitted text. These extracted attributes and/or nodes may then be converted into a standardized vector representation, consistent with the system's dot notation format for integration patterns. The resulting vector may then be subjected to the system's validation workflow, ensuring that the user-submitted integration pattern conforms to technical, security, organizational, or other requirements before it is incorporated into the matrix or made available for selection within GUI 400. If the natural language input does not provide sufficient detail, or if the described integration pattern does not meet validation criteria, second user interface 416 can provide real-time feedback or suggestions to the user, such as highlighting missing information, flagging policy violations, or recommending adjustments to achieve compliance. This can allow users to propose, refine, and validate new integration patterns.

Figure 5:
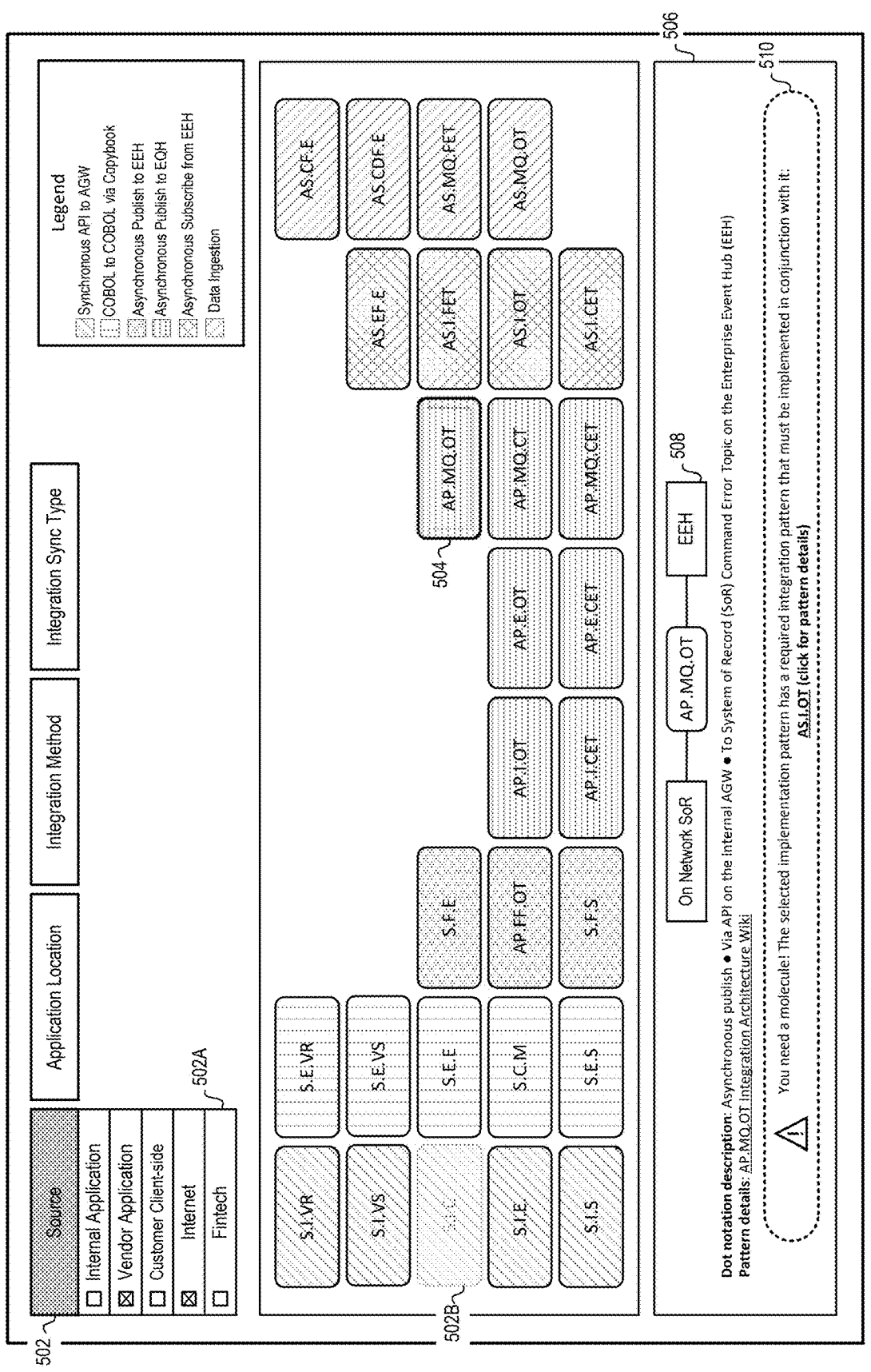
FIG. 5 is a diagram illustrating an example graphical user interface, in accordance with at least one embodiment.

FIG. 5 is a diagram illustrating an example graphical user interface 500, in accordance with at least one embodiment. Graphical user interface 500, herein also referred to as GUI 500, may comprise one or more elements as described in FIG. 4 and may include graphical elements arranged according to a multi-dimensional matrix layout that underlies the integration pattern vector indexing, such as that represented by multi-dimensional matrix 300 of FIG. 3. In addition, GUI 500 may comprise filter element 502, selected user interface graphical element 504 (herein referred to as selected graphical element 504, second user interface 506, integration pattern element 508, and dependency element 510.

Filter element 502 represents a selectable graphical interface component configured to enable users to define one or more criteria pertinent to the selection of integration patterns. Each filter element may be associated with a particular attribute or classification, such as a source node, destination node, integration method, communication protocol, security context, dependency, or other metadata linked to the available integration patterns. Filter element 502 may further include a filter drop-down menu 502A, which permits users to select one or more sub-filters corresponding to attribute values or categories. For example, as illustrated by filter drop-down menu 502A, the user has selected the sub-filters "Vendor Application" and "Internet." Upon receipt of a user selection of one or more sub-filters, GUI 500 may dynamically update the display by visually distinguishing graphical elements that do not satisfy the selected criteria. In one embodiment, this may be accomplished by rendering non-matching graphical elements, such as graphical element 502B, in a grayed-out or visually de-emphasized state, thereby indicating that these elements do not conform to the currently applied filter parameters. Upon the user resetting or deselecting one or more filter criteria, GUI 500 may re-evaluate the current filter state and dynamically update the display to restore previously grayed-out or visually de-emphasized graphical elements to their original appearance. In one embodiment, the system may re-render all graphical elements to their default visual state, thereby indicating that no filtering constraints are presently applied and that all integration pattern options are available for selection. In addition to or alternatively, graphical element 502B may be rendered non-interactive upon being grayed-out or de-emphasized, thereby preventing user selection or interaction with graphical element 502B while the associated filter criteria in filter drop-down menu 502A are active.

Selected graphical element 504 represents a graphical user interface component that has been actively selected by a user. Selected graphical element 504 is configured to remain responsive to user input, as it conforms to the currently applied sub-filter criteria specified in filter drop-down menu 502A, thereby enabling user selection and interaction. In certain embodiments, and as illustrated in GUI 500, the selected graphical element 504 may be visually distinguished by a depressed or concave appearance, thereby indicating its current selection status. Upon detection of a user selection of a graphical element, the second user interface 506 may dynamically update to display information, visualizations, data, or other contextually relevant content associated with selected graphical element 504. In some embodiments, although not depicted in FIG. 5, the system may permit the user to select two or more graphical elements concurrently, in which case the second user interface 506 may be further configured to simultaneously present information related to each of the selected graphical elements.

In some embodiments, second user interface 506 may dynamically update to display information, visualizations, or other contextually relevant content associated with natural language user input received at user input element 408 as depicted in FIG. 4.

Second user interface 506 depicts an interface that has been dynamically updated in response to receiving selected graphical element 504. Second user interface 506 may comprise integration pattern element 508 and dependency element 510. Integration pattern element 508 is an example visual illustration of the integration pattern requirements associated with selected graphical element 504. Integration pattern element 508 may depict the set of nodes participating in a specific integration scenario and, optionally, the ordered sequence in which those nodes must be implemented. In some embodiments, integration pattern element 508 may be rendered as a diagram, flowchart, or other visual means. In addition, the nodes depicted by integration pattern element 508 may be shown as icons, tiles, labels, or other suitable means. The connections between nodes may be represented by directional lines, arrows, or other suitable means to convey the integration order and/or data flow.

In some embodiments, second user interface 506 may present a natural language description of the integration pattern, facilitating user comprehension of the underlying architectural relationships and operational context. Additionally, second user interface 506 may provide a hyperlink that, when selected, opens a website, document, PDF file, or other suitable resource containing pertinent information related to any of the relevant nodes and/or vectors, including selected graphical element 504 or integration pattern element 508. This functionality can enable users to access detailed documentation, technical specifications, or supplementary materials associated with specific integration components or patterns.

Integration pattern element 508 may be generated to provide a visual representation of the relationships among nodes and/or integration pattern vectors that are indexed and/or stored within multi-dimensional matrix 300, as described herein. For instance, as illustrated by integration pattern element 508, selected graphical element 504 corresponds to a set of nodes designated by the vector "AP.MQ.OT." The system may access the corresponding vector "AP.MQ.OT" from multi-dimensional matrix 300 to determine the relationships among the constituent nodes, as well as their associations with other nodes throughout the system. By way of example, and as depicted in integration pattern element 508, the set of nodes represented by "AP.MQ.OT" must be integrated together with additional nodes and/or vectors, such as those associated with "On Network SoR" and "EEH." Although not depicted, the user may be able to select nodes and/or vectors depicted in integration pattern element 508 (e.g., "On Network SoR" and "EEH") to dynamically update second user interface 506 with information on the selected nodes and/or vectors.

Dependency element 510 depicts a visual indicator that conveys a required dependent integration pattern(s). In some embodiments, dependency element 510 may be rendered as a banner, alert, modal pop-up, or other suitable notification mechanism. Additionally or alternatively, dependency element 510 may employ auditory cues such as sound effects or voice prompts to further draw the user's attention to the required dependency.

IV. Methods

FIG. 6 is a block diagram illustrating an example method 600 for integration pattern generation, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 700 may include additional, or fewer operations than those depicted in FIG. 7. The operations of method 600 may be performed by any suitable portion of the integration architecture system 110 of FIG. 1. In some embodiments, method 600 may be executed by components of integration architecture system 802 of FIG. 8. In some embodiments, method 600 may be executed by components of computing device 900 of FIG. 9.

At 602, a plurality of nodes may be identified. The plurality of nodes may belong to a networked environment, such as an information technology environment. Each node may represent a distinct computing entity, such as a system, application, service, platform, device, or microservice, that is capable of participating in integration scenarios. The identification process may involve discovering nodes through automated network scanning, importing node definitions from an existing repository, or receiving user input specifying the components to be managed. Each node is considered a potential participant in one or more integration patterns, and its attributes (e.g., protocol requirements, functional role, etc.) are cataloged for subsequent processing. In some embodiments, the system may receive a request to register a new node that is configured to exchange data with the existing plurality of nodes. Upon receiving such a request, the system can assign a unique identifier to the new node and update the matrix to include one or more integration patterns involving the new node.

At 604, each node may be assigned a unique node identifier. The node identifier can be a string, code, or other machine-readable token that uniquely distinguishes the node from all others in the environment. This identifier may be based on existing system naming conventions, generated by the system, or derived from metadata such as IP addresses, application IDs, or logical names. In some embodiments, the identifier may be manually assigned by a user or other entity. The unique node identifier can allow for precise referencing of nodes when defining integration patterns and ensures unambiguous mapping of relationships within subsequent data structures.

At 606, an integration pattern may be defined. The integration pattern may specify and describe a relationship between two or more nodes in the plurality. An integration pattern can describe how data, commands, or events are exchanged between nodes, encompassing the directionality, protocols, security contexts, dependencies, and other operational requirements. The definition of an integration pattern may be generated by a user, such as a system architect, or automatically generated by the system in response to a detected need, or imported from pre-existing templates or repositories. Each integration pattern can encapsulate the technical and policy requirements necessary to support a valid and approved connection or workflow between nodes. In some embodiments, the system may receive a user-initiated request to define a new integration pattern. Upon receipt of such a request, the system may generate a vector corresponding to the new integration pattern, where the vector comprises the identifiers for each node associated with the new pattern. The generated vector may then subjected to validation based on predefined logic or other criteria, and if validated, is stored in the multidimensional matrix and the database is updated accordingly.

At 608, a vector comprising two or more identifiers may be generated for the defined integration pattern. This vector can comprise two or more identifiers that correspond to the nodes involved in the integration pattern, along with additional segments encoding relevant attributes. The vector can be formatted as a standardized dot notation string, where each segment separated by a period indicates a particular attribute, such as integration type, protocol, security context, directionality, or dependency. For example, a vector such as "AS.I.VR" represents an integration pattern characterized as asynchronous (indicated by "AS"), involving specific nodes, utilizing an internal protocol (indicated by "I"), and including validation requirements (indicated by "VR"). Each segment of the vector, separated by a period, can encode a distinct attribute and/or node of the integration pattern, making the representation both concise and structurally informative for indexing and retrieval within the multi-dimensional matrix. The structure and order of the segments can be defined by a schema that ensures consistency and facilitates parsing, indexing, and downstream processing. The attributes encoded in the vector may include, for example, identifiers encoding whether the operation is synchronous or asynchronous, a designation as external or internal, a particular protocol standard (such as REST, MQ, or SOAP), or a data type relevant to the integration pattern.

At 610, the vector generated for the defined integration pattern may be validated. The vector may be validated based on validation logic that may be defined by a user or other suitable entity. This validation logic can be implemented as a set of rules, templates, or algorithms that determine whether the vector corresponds to an approved integration pattern. Validation checks may include confirming that the combination of nodes and attributes is permitted under organizational policies, that the integration pattern conforms to required security protocols, and that all necessary dependencies are satisfied. The validation process may leverage both automated checks and manual review by system architects, governance authorities, or other suitable entity. Only vectors that satisfy all validation criteria may be approved for inclusion in the system's integration pattern repository. For composite integrations that involve a combination of two or more individual integration patterns, the system can generate a composite pattern and analyze the composite by examining the identifiers and attributes of each included pattern. The system may then determine the validity of the composite integration pattern based on this analysis. Additionally, the system can validate, each time an integration pattern is implemented, whether one or more associated security requirements (which may be defined at least in part based on the node identifiers) are satisfied. These security requirements may include, for example, specific encryption protocols, authentication methods, or network segmentation policies, and are associated with each integration pattern for compliance and operational assurance.

At 612, the validated vector may be stored in a multi-dimensional matrix, such as matrix 300 depicted in FIG. 3. This matrix may index and store a plurality of vectors, each corresponding to a different integration pattern defined within the information technology environment. Each axis of the matrix can represent a classification or attribute, such as node identity along one axis and pattern attribute (e.g., protocol, security context, dependency) along another. The vector can be assigned a position within the matrix based in part on a pattern attribute value, which may be derived from one of the node identifiers or another attribute associated with the integration pattern. When a new vector is generated and validated, the system can update the multidimensional matrix and the underlying database to ensure the new or modified pattern is available for retrieval, analysis, and downstream applications. The matrix structure can enable efficient search, filtering, and clustering, supporting complex queries and visualizations within the graphical user interface.

At 614, the system may determine at least one attribute associated with the integration pattern. This may be accomplished either by parsing the vector, consulting metadata, or referencing underlying pattern definitions. Attributes may include, but are not limited to, protocol type, security context, operational dependencies, compliance requirements, or performance characteristics. The determination of these attributes can allow the system to accurately classify the integration pattern within the matrix and to support advanced search, filtering, and analytics functions. For composite integration patterns, the system can analyze the constituent attributes of each individual pattern included in the combination, and use this analysis to determine the overall validity and compliance of the composite integration pattern.

At 616, an integration dependency may be determined. This may involve analyzing the pattern attribute value, examining the relationship between the involved nodes, applying predetermined rules that specify required dependent pattern integrations, or be based on other criteria. For instance, a particular integration pattern may require a prerequisite authentication service, a logging mechanism, or a specific operational trigger. The system may then identify these dependencies to ensure that the integration pattern can be implemented correctly and that all necessary supporting components are in place. In certain embodiments, the system may also associate security requirements with each integration pattern based at least in part on the node identifiers, which may ensure that all relevant operational and compliance dependencies are enforced.

At 618, the metadata associated with the vector may be updated. The system may update the metadata associated with the vector to include the determined integration dependency or any other relevant attributes. Metadata may also include, but is not limited to, approval status, version information, descriptive names, usage statistics, audit logs, and compliance tags. By updating the vector's metadata, the system can ensure that all dependencies and contextual information are available for downstream tasks such as governance, traceability, and future decision-making.

At 620, the database is updated to include the multi-dimensional matrix. The system can update the underlying database to include the multi-dimensional matrix, incorporating the newly added or modified vector. The database may be implemented using a relational, graph, or in-memory data store, depending on performance and scalability requirements. This update ensures that the most current and complete set of integration patterns is available for retrieval, analysis, and downstream applications. The inclusion of the matrix in the database enables persistent storage, supports enterprise-wide access, and provides a foundation for automated governance, compliance monitoring, and continuous improvement of the integration architecture. The system may also display, via a graphical user interface, a visual representation of the multidimensional matrix. Each vector stored in the matrix can be rendered as a selectable graphical element, with the interface providing one or more filters corresponding to node identifiers or pattern attributes. In response to a filter selection, the interface dynamically updates to display only those elements representing integration patterns that satisfy the filter selection. Furthermore, when a user selects an integration pattern, the graphical user interface may display associated information, such as a description of the integration pattern and relevant metadata, enabling efficient review, comparison, and decision-making.

FIG. 7 is a block diagram illustrating an example method 700 for generating a graphical user interface, in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion of the integration architecture system 110 of FIG. 1. In some embodiments, method 700 may be executed by components of integration architecture system 802 of FIG. 8. In some embodiments, method 700 may be executed by components of computing device 900 of FIG. 9.

At 702, the system may receive a plurality of nodes. The plurality of nodes may include various systems, services, applications, APIs, or other computing entities capable of participating in integration scenarios. These nodes can be processed and associated with attributes such as supported protocols, roles, and connectivity options.

At 704, the system may receive a plurality of vectors defining a plurality of integration patterns for the plurality of nodes. The system may encode the participating nodes and their pattern attributes in a dot notation or similar structured format. These vectors may be generated by automated discovery, user input, or import from external repositories. The attributes may include type (e.g., synchronous, asynchronous), protocol, security context, and dependencies. In some embodiments, the system can also receive integration pattern data as text input at a second user interface, identify nodes and attributes from the input, and convert it into a standardized vector format, thereby supporting user-driven integration pattern definitions.

At 706, the plurality of vectors may be stored in an M-dimensional matrix. Each axis of the M-dimensional matrix may represent a different classification criterion, such as node identity or pattern attribute. This structure can support indexing, filtering, and retrieval of integration patterns, as well as the dynamic organization of patterns into higher-order groupings (sub-matrices) for architectural analysis and visualization.

At 708, the system may generate a plurality of graphical elements representing the plurality of vectors. Each graphical element may be rendered as a selectable tile or icon in the user interface, thereby visually representing an integration pattern and positioned based on its matrix coordinates. The system may also allow multiple arrangement tables that define how graphical elements are grouped and displayed, and can re-render the interface according to user-selected arrangement rules. Furthermore, the graphical elements may support selection, allowing users to choose individual or multiple patterns for analysis, validation, and other workflows.

At 710, the system may provide a first user interface. The first user interface can display the graphical elements in a matrix layout, with axes corresponding to nodes and pattern attributes. The first user interface may include a table selector, enabling users to select from multiple arrangement tables with different ordering and grouping logic for the graphical elements. In response to a table selection, the system can determine the new positions of each graphical element and re-render the interface to reflect the arrangement.

At 712, the system may receive a selection of a first user interface element. If multiple elements are selected, the system can generate a candidate integration pattern or pattern set based on the selection. It then validates the candidate pattern(s) against a ruleset of approved patterns and displays a validity indicator in a third user interface or guidance panel, thereby providing feedback to the user.

At 714, responsive to the selection, a second user interface may be provided. If the selected pattern has dependencies (such as requiring concurrent implementation of related patterns), the system can retrieve dependency metadata from a dependency rules dataset, determine the required concurrency, and display a concurrency requirement indicator in a second user interface. The second user interface may also present a user interface element, such as a hyperlink, that links to a documentation page for the selected integration pattern. If the hyperlink is selected, the system navigates to the documentation page and displays comprehensive information about the pattern. Furthermore, the second user interface may present security and compliance requirements associated with the selection, such as required encryption, authentication, or regulatory controls, so users are fully informed of all relevant constraints. The second user interface may also allow users to submit integration pattern data as text input, which the system parses and converts into a standardized vector for validation and inclusion in the matrix, thereby facilitating user-driven pattern creation and validation workflows.

V. Computer Systems & Devices

Figure 8:
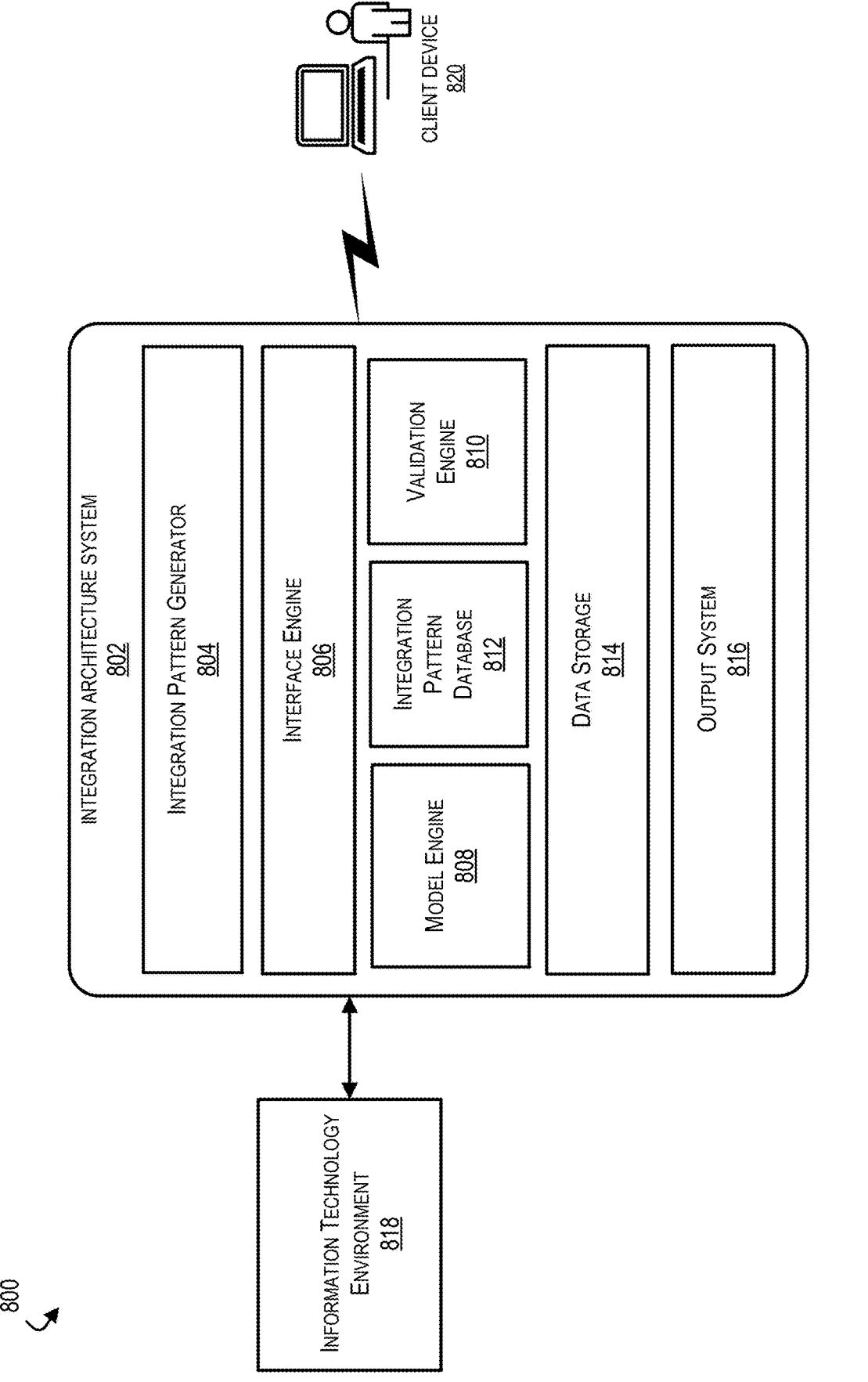
FIG. 8 is a block diagram of an example computing system that can be used to perform aspects of the examples of the present disclosure, in accordance with at least one embodiment.

FIG. 8 is a block diagram of an example computing system 800 that can be used to perform aspects of the examples of the present disclosure, in accordance with at least one embodiment. Computing system may include an information technology environment 818, client device 820, and integration architecture system 802. Integration architecture system 802 may include an integration pattern generator 804, interface engine 806, model engine 808, integration pattern database 812, validation engine 810, data storage 814, and output system 816. As one skilled in the art may appreciate, computing system 800 may include additional or fewer components than those depicted in FIG. 8.

Information technology environment 818 may be a networked ecosystem that can comprise a variety of interconnected computing components, collectively referred to as nodes. These nodes may include, but are not limited to, application programming interfaces (APIs), databases, microservices, enterprise applications, middleware services, batch processing systems, message queues, file servers, cloud-based resources, external vendor endpoints, and other hardware or software modules that perform computational, storage, or communication functions. Each node within environment 818 can be associated with a unique computing entity, such as a server, virtual machine, container, or cloud service instance, and may be physically or logically distributed across on-premises data centers, private or public cloud platforms, hybrid cloud deployments, or edge locations. Nodes within information technology environment 818 may communicate over network connections that may leverage a variety of protocols and data exchange formats. For example, nodes may interact using RESTful HTTP/S APIs, SOAP-based web services, message-oriented middleware such as AMQP or MQTT, direct database queries over JDBC/ODBC, or file transfers via SFTP, SMB, or cloud storage APIs. Information technology environment 818 may support both synchronous request/response and asynchronous publish/subscribe or event-driven communication paradigms, depending on the integration pattern and business requirements.

To facilitate secure and reliable communication between nodes, information technology environment 818 may implement a range of supporting infrastructure and policies, including network segmentation (such as VLANs or virtual private clouds), firewall rules and access control lists, identity and access management (IAM) systems for authentication and authorization, and encryption mechanisms for data in transit and at rest. Nodes may be registered in a centralized service registry or configuration management database (CMDB), allowing for automated discovery, monitoring, and management of the environment's components. Information technology environment 818 may further incorporate monitoring and observability tools to track node health, network performance, and integration transaction logs, as well as orchestration platforms (such as Kubernetes or cloud-native PaaS solutions) for dynamic provisioning, scaling, and lifecycle management of nodes. Policies for compliance, data governance, and regulatory requirements may be enforced at the node level, ensuring that integrations adhere to standards such as PCI DSS, HIPAA, GDPR, or organization-specific guidelines.

Integration patterns can define the relationships, data flows, and operational dependencies between nodes within information technology environment 818. Each integration pattern may specify which nodes act as sources or destinations, the protocols and security measures required, and any prerequisite services or triggers needed for successful integration. Information technology environment 818 may transmit and/or receive data with integration architecture system 802 for purposes of discovering, defining, validating, and managing integration patterns among its constituent nodes. This data exchange may include transmitting metadata about available systems, applications, services, or resources (collectively referred to as nodes), reporting on operational status or topology, or providing information necessary for pattern generation and validation, such as supported protocols, security requirements, or compliance constraints. Additionally, information technology environment 818 may receive configuration updates, validated integration pattern vectors, recommended implementation templates, or automated orchestration instructions generated by integration architecture system 802. The ongoing communication between environment 818 and integration architecture system 802 can allow for real-time synchronization of integration architecture, enables automated validation workflows, and ensures that the state of integrations accurately reflects both enterprise technical requirements and operational realities.

Integration architecture system 802 may manage and execute operations related to the design, validation, management, and governance of integration patterns across the IT environment 818. Integration pattern generator 804 may define and generate integration patterns based on input received from users, automated discovery, imported templates, or other suitable means. It may create integration patterns by specifying the participating nodes, integration methods, protocols, security contexts, and dependencies. Additionally, integration pattern generator 804 may support user-driven integration pattern generation via graphical or text-based interfaces, as well as automated pattern suggestion using analytics or machine learning.

Interface engine 806 can manage all user interactions with the system, including graphical user interfaces (GUIs), dashboards, and application programming interfaces (APIs). It may facilitate the rendering, visualization, filtering, and selection of integration patterns by users, and handles the input, display, and manipulation of vectors, matrices, and related metadata on the user interface(s). Interface engine 806 may also support dynamic updates, such as graying out non-applicable patterns based on user selections.

Model engine 808 may be responsible for the internal representation and management of integration patterns as vectors and matrices. It can encode the defining attributes of each pattern into standardized formats (such as dot notation strings), and manage the organization, indexing, and retrieval of patterns within multi-dimensional matrices. The model engine 808 may also support clustering, grouping, and higher-order pattern "family" management, enabling advanced analytics and architectural consistency.

The validation engine 810 can perform rule-based, policy-driven, or machine learning-aided validation of integration patterns before they are approved for inclusion in the repository and/or multidimensional matrix. It can check patterns for compliance with technical, security, operational, and organizational requirements, verify dependencies, and can check that proposed integrations do not conflict with existing patterns or policies. The engine may also provide real-time feedback to users, flag non-compliant patterns, and support both automated and manual review workflows.

Integration pattern database 812 can be a persistent storage component that can maintain the repository of all defined, approved, and historical integration patterns, including their vector representations, metadata, validation status, version history, and associated documentation. Integration pattern database 812 can support efficient querying, indexing, and retrieval, enabling analytics, reporting, governance, and compliance functions. It may be implemented using relational, NoSQL, graph, or multi-model database technologies, depending on scalability and access needs. Data storage 814 may provide for additional capacity for storing supporting data, such as raw input, audit logs, usage statistics, configuration files, and backup archives. It may be integrated with integration pattern database 812 or implemented as a separate, secure storage layer.

Output system 816 may be responsible for generating reports, dashboards, notifications, or automated workflow outputs based on integration pattern data. It can produce visualizations for architectural review, compliance attestations, code or template generation for implementation, and alerts for governance or operational monitoring. The output system 816 may interface with external tools for diagramming, code deployment, compliance tracking, or business intelligence.

Client device 820 may be any suitable device such as a desktop computer, laptop, workstation, tablet, or mobile device, that is capable of interfacing with integration architecture system 802 over a network connection. Client device 820 may be equipped with a display, input mechanisms (such as a keyboard, mouse, or touchscreen), and an operating system capable of rendering web-based or native graphical user interfaces. Users such as solution architects, technical managers, or integration specialists may interact with the integration architecture platform primarily through this client device. Integration architecture system 802 can be configured to generate a dynamic graphical user interface (GUI) that is rendered on client device 820, enabling users to visualize, filter, select, and manage integration patterns. The GUI may be implemented as a web application, a desktop application, or a hybrid interface, and is transmitted from the interface engine 806 or associated backend components to the client device via secure network protocols (such as HTTPS or WebSocket).

Figure 9:
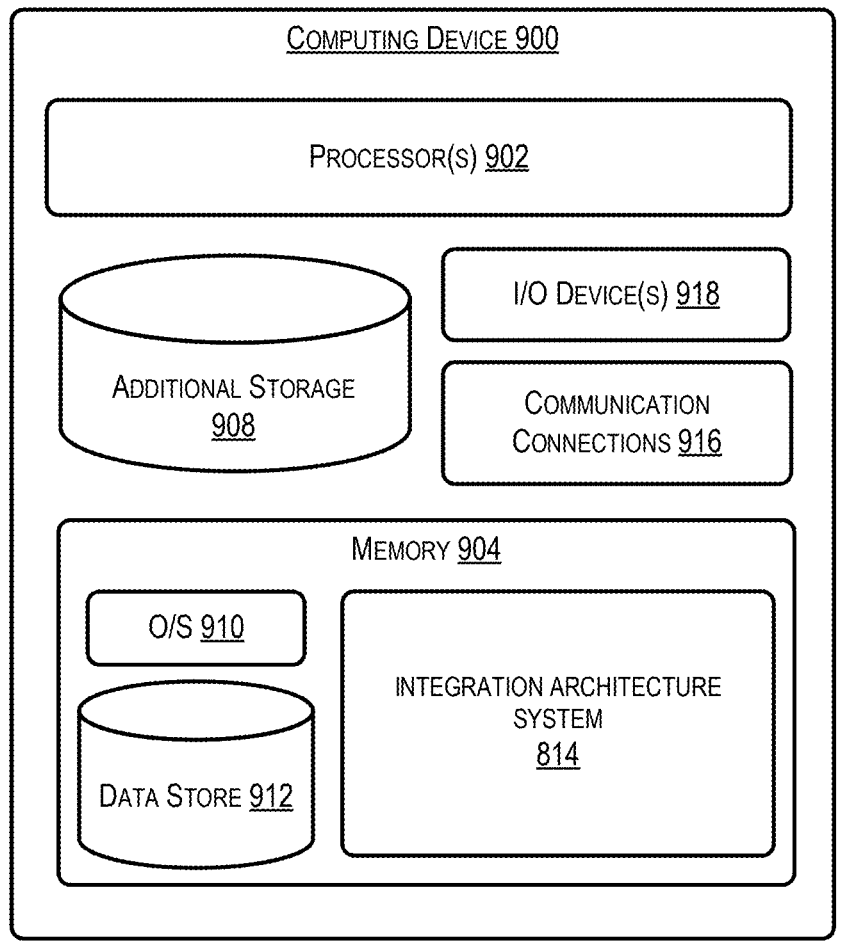
FIG. 9 is a block diagram of an example computing device that can be used to perform aspects of the examples of the present disclosure, in accordance with at least one embodiment.

FIG. 9 illustrates an example computing device 900 that may implement the methods disclosed herein. In some embodiments, the computing device 900 may include one or more processors (e.g., processor(s) 902). The processor(s) 902 may be implemented in hardware, computer-executable instructions, firmware, or combinations thereof. Computer-executable instruction or firmware implementations of the processor(s) 902 may include computer-executable or machine-executable instructions written in any suitable programming language.

Computing device 900 may include memory 904. The memory 904 may store computer-executable instructions that are loadable and executable by the processor(s) 902, as well as data generated during the execution of these programs. The memory 904 may be volatile (such as RAM) and/or non-volatile (such as ROM, flash memory, etc.). The computing device 900 may include additional storage 908, which may include removable storage and/or non-removable storage. The additional storage 908 may include but is not limited to, magnetic storage, optical disks, and/or tape storage. The disk drives and their associated computer-readable media may provide non-volatile storage of computer-readable instructions, data structures, program engines, and other data for the computing devices. In some implementations, the memory 904 or additional storage 908 may individually, or collectively, include multiple different types of memory, such as SRAM, DRAM, or ROM.

The memory 904 and/or additional storage 908 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 904 and the additional storage 908 are examples of computer storage media. Memory 904 and/or additional storage 908 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 900. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 904 and/or additional storage 908 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 904 and the additional storage 908 are examples of computer storage media. Memory 904 and/or additional storage 908 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 900. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 904 may include an operating system 910 and one or more data stores 912, and/or one or more application programs, engines, or services for implementing the features disclosed herein, such as the features provided by the integration architecture system 802 (an example of integration architecture system 110 of FIG. 1).

The computing device may also contain communications connection(s) 916 that allow the computing device 900 to communicate with a stored database, another computing device, a server, user terminals, and/or other devices (e.g., via one or more networks, not depicted). The computing device may also include I/O device(s) 918, such as a keyboard, a mouse, a pen, a voice input device, a touch input device, a display, speakers, a printer, etc.

In one exemplary embodiment, the techniques described herein are utilized to manage information technology operations within financial and banking environments in order to facilitate regulatory compliance and mitigate operational risk. In this context, each node may correspond to a distinct computational asset or component, such as an application, service, server device, client device, network access point, or other networked element. Each network component may be associated with a defined set of compliance requirements that must be satisfied for the component to be deemed authorized for integration within the broader network environment. For example, these requirements may specify prerequisite components that must be provisioned in conjunction with a given network element, dependencies dictating the sequence of component integration, or validation protocols that must be executed to ensure secure and compliant operation. Pattern attributes may represent standardized network components, integration patterns, operational dependencies, or other relevant technical characteristics. These requirements and attributes can be programmatically encoded as vectors and indexed within a multi-dimensional matrix according to their respective pattern attributes. The resulting multi-dimensional matrix provides a dynamic mechanism for filtering by network component, enabling users to identify integration patterns and compliance requirements based on component type, pattern attribute, or other distinguishing criteria. Additionally, the multi-dimensional matrix may be exposed via a graphical user interface, offering users a visual and interactive representation of the integration patterns and their interrelationships.

In one exemplary embodiment, the techniques discussed herein can be leveraged to structure and manage complex healthcare protocols and patient treatment pathways. In a clinical setting, each node in the matrix may represent a medical condition, diagnostic stage, or patient risk factor, while each pattern attribute can correspond to a treatment modality, medication, intervention, or regulatory requirement. By encoding treatment protocols as vectors and positioning them in a multi-dimensional matrix, healthcare providers can visually navigate through available care pathways, identify prerequisite interventions (such as required laboratory tests or imaging), and ensure that treatment decisions comply with clinical guidelines. This approach can allow practitioners to assess which protocols are suitable for a given patient profile, account for comorbidities, and track dependencies such as necessary follow-up appointments or specialist referrals. The matrix can be dynamically filtered based on patient-specific data, such as age, allergies, or insurance coverage, to present only those pathways that are medically appropriate and administratively permissible. Additionally, the matrix can be used to maintain up-to-date compliance with evolving medical standards and to facilitate audit trails for regulatory reporting.

In another exemplary embodiment, the techniques discussed herein can provide a framework for organizing and personalizing learning pathways. Each node may represent a subject area, course module, or competency, while pattern attributes capture prerequisite knowledge, skill level, delivery format (e.g., online, in-person), or assessment type. Learning activities, curricula, or certification tracks can be encoded as vectors and stored within the matrix, where their position reflects their place within the broader educational structure. Educators and learners can use the matrix to visualize available learning options, identify gaps in prerequisite knowledge, and construct individualized learning journeys that satisfy both academic progression and accreditation requirements. Dynamic filtering may allow the system to present only those modules that are accessible based on completed prerequisites or learner goals, while metadata can be used to track progress, performance outcomes, and alignment with certification frameworks. This structured approach can support adaptive learning, gap analysis, and efficient mapping of educational content to learning objectives or industry standards.

In another exemplary embodiment, legal, compliance, and regulatory entities can employ the techniques disclosed herein to manage and track legal obligations, contract clauses, or regulatory requirements across multiple jurisdictions and domains. Each node may represent a specific jurisdiction, business unit, or contract type, while each pattern attribute corresponds to a regulatory area (e.g., data privacy, anti-money laundering, environmental compliance), clause type, or compliance status. Legal obligations can be encoded as vectors, capturing the interplay between applicable law, contractual commitments, and organizational practices, and are positioned in the matrix according to their defining attributes. This organization can allow compliance officers to assess coverage across different legal domains, identify overlapping or conflicting obligations, and visualize gaps in regulatory compliance. The matrix may support dynamic filtering to surface only those obligations relevant to a particular transaction, geography, or risk profile, and can link related obligations that must be addressed concurrently. Metadata may include risk ratings, audit results, or renewal deadlines, supporting automated compliance checks, reporting, and audit preparation.

The various embodiments further can be implemented in a wide variety of operating environments, which in some cases can include one or more user computers, computing devices, or processing devices that can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art of supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers.

The server(s) also may be capable of executing programs or scripts in response to requests from electronic devices, such as by executing one or more Web applications that may be implemented as one or more scripts or programs written in any programming language, such as Java®, C, C#, or C++, or any scripting language, such as JavaScript, Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as suitable. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flashcards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media computer readable media for containing code, or portions of code, can include any suitable media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The order of the blocks presented in the examples above can be varied, for example, blocks can be re-ordered, combined, and/or broken into sub-blocks. Certain blocks or processes can be performed in parallel. The inventors expect skilled artisans to employ such variations as suitable and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

What is claimed is:

1. A method comprising:

receiving a plurality of nodes, wherein each node corresponds to a unique computing entity in an information technology environment;

receiving a plurality of vectors that define a plurality of integration patterns for the plurality of nodes, wherein each integration pattern of the plurality of integration patterns encodes a communication protocol for the information technology environment;

storing the plurality of vectors in a multidimensional matrix, wherein the plurality of vectors is indexed in the multidimensional matrix by at least one of a pattern attribute or a node attribute, wherein the multidimensional matrix represents position information for the plurality of vectors, and wherein the position information defines a row index and a column index of the multidimensional matrix;

generating a plurality of graphical elements representing the plurality of vectors;

providing a first user interface for presentation at a computer system, wherein the first user interface includes the plurality of graphical elements positioned in a grid arrangement based at least in part on the position information;

receiving a selection of a first user interface element representing a first vector for presentation in an organizational interface; and responsive to the selection, providing a second user interface for presentation at the computer system, wherein the second user interface includes an integration pattern guidance panel.

2. The method of claim 1, further comprising:

retrieving, from a dependency rules dataset, dependency metadata for the selection;

determining, based at least on the dependency metadata, that one or more dependent integration patterns are required to be implemented concurrently with the selection; and presenting, at the second user interface, a concurrency requirement indicator that identifies the one or more dependent integration patterns.

3. The method of claim 1, further comprising:

presenting, at the first user interface, a table selector, wherein the table selector includes a plurality of arrangement tables, and wherein each table defines ordering and grouping rules for the graphical elements;

receiving a selection of one arrangement table;

determining, for each graphical element, a position within the first user interface based at least on the ordering and grouping rules associated with the selection; and in response to the selection, re-rendering the first user interface to display the graphical elements in accordance with the determination.

4. The method of claim 1, further comprising:

presenting, at the second user interface and in response to the selection, a user interface element comprising a hyperlink to a document page for an integration pattern associated with the selection; and in response to a subsequent selection of the hyperlink, navigating to the document page, wherein the document page comprises information corresponding to the integration pattern.

5. The method of claim 1, further comprising:

receiving integration pattern data at the second user interface, wherein the integration pattern data comprises text input;

identifying, from the text input, nodes in the information technology environment; and converting the integration pattern data into a standardized vector by mapping each node to a predefined scheme, thereby generating a dot notation.

6. The method of claim 1, further comprising:

presenting, at the first user interface, a plurality of selectable graphical elements;

receiving a selection of graphical elements;

determining, based at least on the selection of graphical elements, a candidate integration pattern;

validating the candidate integration pattern based at least on a ruleset defining approved integration patterns; and presenting, at a third user interface, a validity indicator corresponding to the candidate integration pattern.

7. The method of claim 1, further comprising:

receiving a selection of a plurality of graphical elements, wherein each selection corresponds to a unique vector;

generating, based at least on the plurality of graphical elements, a candidate integration pattern set;

identifying, based at least on the candidate integration pattern set, at least one of an incompatibility amongst the graphical elements in the candidate integration pattern set or a conflict based on a ruleset defining approved integration patterns; and presenting, at the integration pattern guidance panel, a validity indicator corresponding to the candidate integration pattern set.

8. The method of claim 1, wherein the second user interface presents at least one of a security or a compliance requirement associated with the selection.

9. A system comprising:

a memory configured to store computer-executable instructions; and a processor configured to access the memory and execute the computer-executable instructions to at least:

receive a plurality of nodes, wherein each node corresponds to a unique computing entity in an information technology environment;

receive a plurality of vectors that define a plurality of integration patterns for the plurality of nodes, wherein each integration pattern of the plurality of integration patterns encodes a communication protocol for the information technology environment;

store the plurality of vectors in a multidimensional matrix, wherein the plurality of vectors is indexed in the multidimensional matrix by at least one of a pattern attribute or a node attribute, wherein the multidimensional matrix represents position information for the plurality of vectors, and wherein the position information defines a row index and a column index of the multidimensional matrix;

generate a plurality of graphical elements representing the plurality of vectors;

provide a first user interface for presentation at a computer system, wherein the first user interface includes the plurality of graphical elements positioned in a grid arrangement based at least in part on the position information;

receive a selection of a first user interface element representing a first vector for presentation in an organizational interface; and responsive to the selection, provide a second user interface for presentation at the computer system, wherein the second user interface includes an integration pattern guidance panel.

10. The system of claim 9, further configured to:

retrieve, from a dependency rules dataset, dependency metadata for the selection;

determine, based at least on the dependency metadata, that one or more dependent integration patterns are required to be implemented concurrently with the selection; and present, at the second user interface, a concurrency requirement indicator that identifies the one or more dependent integration patterns.

11. The system of claim 9, further configured to:

present, at the first user interface, a table selector, wherein the table selector includes a plurality of arrangement tables and wherein each table defines ordering and grouping rules for the graphical elements;

receive a selection of one arrangement table;

determine, for each graphical element, a position within the first user interface based at least on the ordering and grouping rules associated with the selection; and in response to the selection, re-render the first user interface to display the graphical elements in accordance with the determination.

12. The system of claim 9, further configured to:

receive integration pattern data at the second user interface, wherein the integration pattern data comprises text input;

identify, from the text input, nodes in the information technology environment; and convert the integration pattern data into a standardized vector by mapping each node to a predefined scheme, thereby generating a dot notation.

13. The system of claim 9, further configured to:

present, at the first user interface, a plurality of selectable graphical elements;

receive a selection of graphical elements;

determine, based at least on the selection of graphical elements, a candidate integration pattern;

validate the candidate integration pattern based at least on a ruleset defining approved integration patterns; and present, at a third user interface, a validity indicator corresponding to the candidate integration pattern.

14. The system of claim 9, further configured to:

receive a selection of a plurality of graphical elements, wherein each selection corresponds to a unique vector;

generate, based at least on the plurality of graphical elements, a candidate integration pattern set;

identify, based at least on the candidate integration pattern set, at least one of an incompatibility amongst the graphical elements in the candidate integration pattern set or a conflict based on a ruleset defining approved integration patterns; and present, at the integration pattern guidance panel, a validity indicator corresponding to the candidate integration pattern set.

15. A one or more non-transitory computer-readable media storing computer-readable instructions that, when executed by one or more processors, cause a system to perform operations comprising:

receiving a plurality of nodes, wherein each node corresponds to a unique computing entity in an information technology environment;

receiving a plurality of vectors that define a plurality of integration patterns for the plurality of nodes, wherein each integration pattern of the plurality of integration patterns encodes a communication protocol for the information technology environment;

storing the plurality of vectors in a multidimensional matrix, wherein the plurality of vectors is indexed in the multidimensional matrix by at least one of a pattern attribute or a node attribute, wherein the multidimensional matrix represents position information for the plurality of vectors, and wherein the position information defines a row index and a column index of the multidimensional matrix;

generating a plurality of graphical elements representing the plurality of vectors;

providing a first user interface for presentation at a computer system, wherein the first user interface includes the plurality of graphical elements positioned in a grid arrangement based at least in part on the position information;

receiving a selection of a first user interface element representing a first vector for presentation in an organizational interface; and responsive to the selection, providing a second user interface for presentation at the computer system, wherein the second user interface includes an integration pattern guidance panel.

16. The one or more non-transitory computer-readable media of claim 15, further comprising:

retrieving, from a dependency rules dataset, dependency metadata for the selection;

determining, based at least on the dependency metadata, that one or more dependent integration patterns are required to be implemented concurrently with the selection; and presenting, at the second user interface, a concurrency requirement indicator that identifies the one or more dependent integration patterns.

17. The one or more non-transitory computer-readable media of claim 15, further comprising:

presenting, at the first user interface, a table selector, wherein the table selector includes a plurality of arrangement tables and wherein each table defines ordering and grouping rules for the graphical elements;

receiving a selection of one arrangement table;

determining, for each graphical element, a position within the first user interface based at least on the ordering and grouping rules associated with the selection; and in response to the selection, re-rendering the first user interface to display the graphical elements in accordance with the determination.

18. The one or more non-transitory computer-readable media of claim 15, further comprising:

presenting, at the second user interface and in response to the selection, a user interface element comprising a hyperlink to a document page for an integration pattern associated with the selection; and in response to a subsequent selection of the hyperlink, navigating to the document page, wherein the document page comprises information corresponding to the integration pattern.

19. The one or more non-transitory computer-readable media of claim 15, further comprising:

receiving integration pattern data at the second user interface, wherein the integration pattern data comprises text input;

identifying, from the text input, nodes in the information technology environment; and converting the integration pattern data into a standardized vector by mapping each node to a predefined scheme, thereby generating a dot notation.

20. The one or more non-transitory computer-readable media of claim 15, further comprising:

presenting, at the first user interface, a plurality of selectable graphical elements;

receiving a selection of graphical elements;

determining, based at least on the selection of graphical elements, a candidate integration pattern;

validating the candidate integration pattern based at least on a ruleset defining approved integration patterns; and presenting, at a third user interface, a validity indicator corresponding to the candidate integration pattern.

* * * * *